United States Patent
Okuda et al.

(10) Patent No.: US 7,211,162 B2
(45) Date of Patent: May 1, 2007

(54) METHOD AND APPARATUS FOR MOLDING BEAD

(75) Inventors: Shinji Okuda, Hyogo (JP); Masaharu Takada, Osaka (JP); Hitoshi Fujii, Hyogo (JP)

(73) Assignees: Sunstar Giken Kabushiki Kaisha, Osaka (JP); Sunstar Suisse SA, Ecublens (CH)

( * ) Notice: Subject to any disclaimer, the term of this patent is extended or adjusted under 35 U.S.C. 154(b) by 343 days.

(21) Appl. No.: 10/819,178

(22) Filed: Apr. 7, 2004

(65) Prior Publication Data

US 2004/0188001 A1    Sep. 30, 2004

Related U.S. Application Data

(62) Division of application No. 09/831,453, filed as application No. PCT/JP99/06313 on Nov. 12, 1999, now abandoned.

(30) Foreign Application Priority Data

Nov. 12, 1998  (JP) .............................. 322177/1998

(51) Int. Cl.
*B32B 5/20*    (2006.01)

(52) U.S. Cl. ..................... 156/78; 156/79; 264/45.4; 264/45.9

(58) Field of Classification Search ............... None
See application file for complete search history.

(56) References Cited

U.S. PATENT DOCUMENTS

| | | |
|---|---|---|
| 3,635,632 A | 1/1972 | Shaw et al. |
| 3,901,958 A | 8/1975 | Doll |
| 4,303,736 A | 12/1981 | Torobin |
| 4,434,250 A | 2/1984 | Kessler |
| 4,744,932 A | 5/1988 | Browne |
| 4,809,885 A | 3/1989 | Hayashi et al. |
| 5,089,190 A | 2/1992 | Trevathan et al. |
| 5,368,458 A | 11/1994 | Addeo et al. |
| 5,402,351 A | 3/1995 | Batchelder et al. |
| 5,979,794 A | 11/1999 | DeFillipi et al. |

FOREIGN PATENT DOCUMENTS

| | | |
|---|---|---|
| JP | 50-53464 | 5/1975 |
| JP | 5-69469 | 3/1993 |
| JP | 9-174655 | 7/1997 |

*Primary Examiner*—Sam Chuan Yao
(74) *Attorney, Agent, or Firm*—Wenderoth, Lind & Ponack, L.L.P.

(57) ABSTRACT

A hollow bead of high quality is applied and molded into a shape corresponding to and following a shape of an applying position onto which the bead is to be applied. A bead-molding apparatus includes a discharging device of a double nozzle structure comprised of an inner nozzle and an outer nozzle, a highly viscous material feed unit for feeding a highly viscous material that is fluid in a form of a stream in a high speed flow region and can retain a shape into which it is applied and molded in a low speed flow region, a manipulator disposed so as to transfer the discharging device mounted thereon to a desired position, and a controller for controlling overall operations of the apparatus. The discharging device is controlled so as to move along the applying position of a member while feeding gases thereto from the inner nozzle and discharging the highly viscous material thereto from the outer nozzle.

20 Claims, 13 Drawing Sheets

Fig. 4
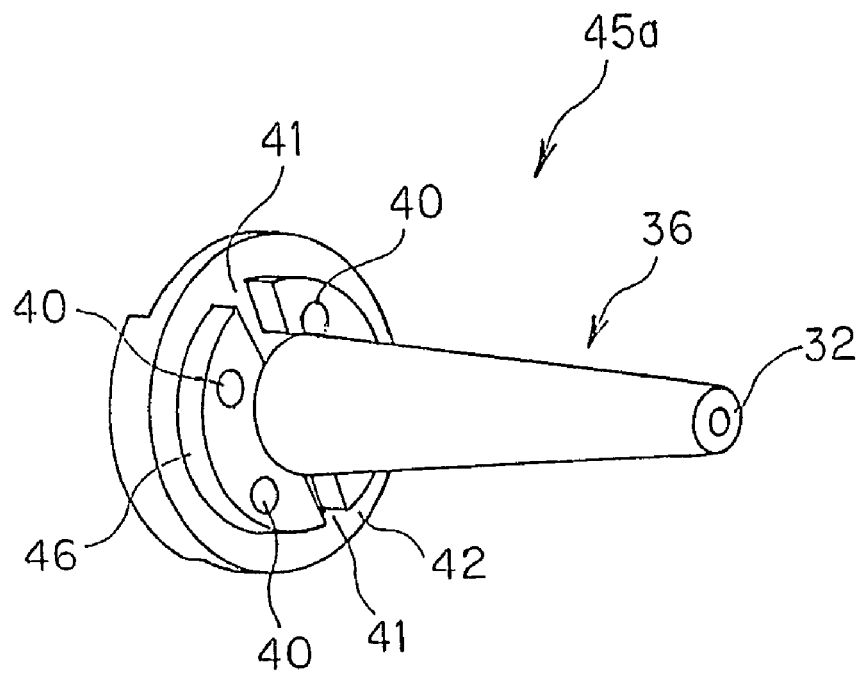
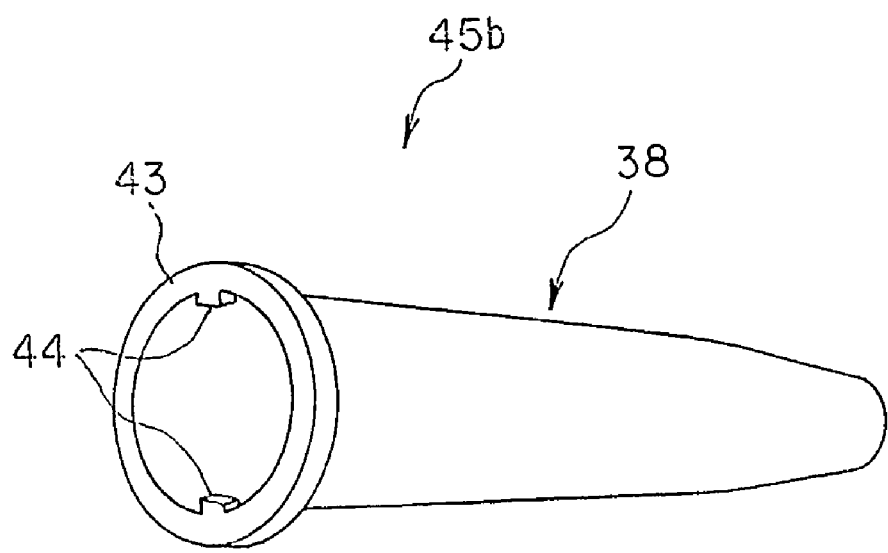

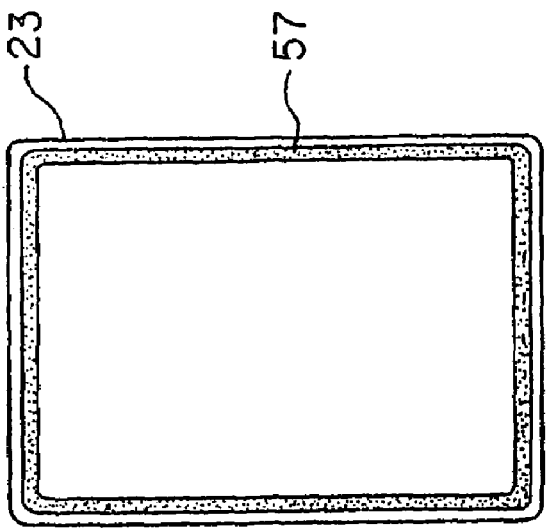
Fig. 8(b) AFTER APPLYING
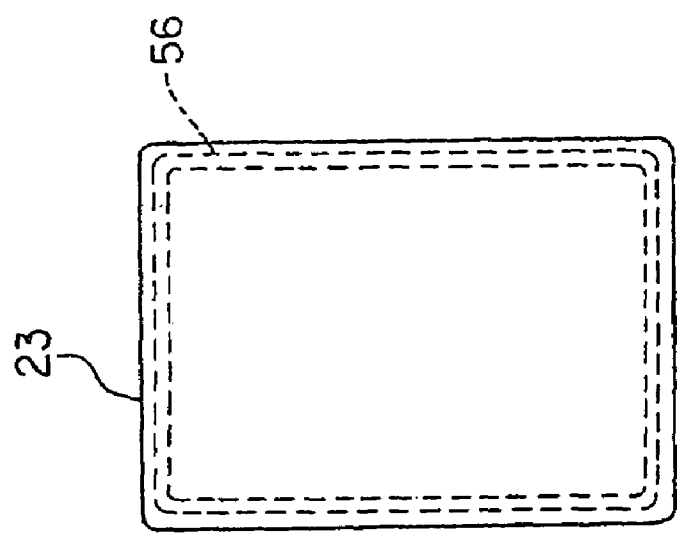
Fig. 8(a) BEFORE APPLYING

METHOD AND APPARATUS FOR MOLDING BEAD

This is a Divisional Application of U.S. application Ser. No. 09/831,453, filed May 9, 2001, now abandoned, which is the National Stage of International Application NO. PCT/JP99/06313, filed Nov. 12, 1999 is the National Stage of International Application No. PCT/JP99/06313, filed Nov. 12, 1999.

FIELD OF THE INVENTION

The present invention relates to a method and an apparatus for molding a bead. More particularly, the present invention relates to a method for molding a hollow bead into an irregular shape from a highly viscous material or a foamable material, and a method for molding a foamed bead covered with a highly viscous material into an irregular shape, as well as to an apparatus for molding such a hollow bead and foamed bead.

DESCRIPTION OF THE RELATED ART

Japanese Patent Application Laid-open No. 3-178,362 discloses a method and an apparatus for applying and molding a highly viscous material into foamed hollow bead (having a hollow foamed portion raised in a linear fashion) or a foamed bead with its section being expandable.

The applying and molding apparatus disclosed in this prior patent application uses a mixer of a low energy consumption type for reducing heat generation and includes a mixing device that mixes feed gases in a pressurized state into the highly viscous material and feeds a foamable material with the highly viscous material dispersed in minute particles. The applying and molding apparatus further includes a discharging device that foams the foamable material fed from the mixing device by discharging it onto a work surface and forms a hollow bead in a tubular shape. As shown in FIG. 13, the discharging device includes a nozzle for discharging foamable material comprised of a mixture of the highly viscous material with the pressurized gases, and a plunger disposed so as to be slidable in a direction (as indicated by symbol P) along an inner hole of the nozzle by movement of a compression air piston (not shown).

Further, an inner hole of the nozzle of this applying device has a channel and a tapered wall section, with the channel being disposed for carrying the foamable material fed to the nozzle to an orifice located at a tip section of the nozzle, and with the tapered wall section forming an inner wall portion extending from an end of the channel to the orifice thereof. On the other hand, the plunger includes a head portion in the form of an inverse truncated cone and a sectionally circular tip portion, with a bottom portion being disposed so as to block the nozzle by close abutment with the tapered wall section, and with the sectionally circular tip portion being formed by cutting off the conical top section thereof while retaining a small portion with this cut top rendered flat.

As the plunger is located in the position as indicated in FIG. 13 and the nozzle is open, foamable material fed to the nozzle from the mixing device travels through the channel in a direction as indicated by symbol Q in this drawing. The foamable material flows along a side surface of the truncated-conical head portion of the plunger in a pressurized state up to the circular tip portion thereof. Once the foamable material reaches the circular tip portion of the plunger, pressure of the foamable material is caused to drop rapidly through the channel because no plunger exists in the channel ahead of the circular tip portion and a sectional path area of the channel increases rapidly. Therefore, rapid drop of the pressure of the foamable material occurs in a central area of the channel immediately under the circular tip portion, as shown in FIG. 13, to an area where the pressure drops. Within this pressure drop area of the channel, the foamable material is allowed to be formed into small masses as gaseous cores, where gases mixed with the foamable material have been released outside from this mixture or brought into a state where they are likely to be released outside therefrom.

A remaining and surrounding portion of the foamable material, where no such gaseous cores are formed, foams into gaskets upon discharge from the orifice and rapid reduction in pressure of the foamable material up to atmospheric pressure. As the foamable material is being fed and foaming is being performed continually, highly viscous polymer material forms an extruded bead in a tubular shape. On the other hand, the gaseous cores of the foamable material formed in the pressure drop area of the channel are allowed to foam at an early stage, for example, even during a course of the foamable material travelling through the nozzle, while being flown along an axis of the tubular bead. The gaseous cores in a central portion of the tubular bead are allowed to foam earlier than the mixture at a surrounding portion, so that the central portion of the tubular bead is formed into a hollow bead in a tubular shape, while the mixture at the surrounding portion foams.

The hollow tubular bead can completely seal, for example, a gap between an aperture and an opening/closing member by applying such a bead to a contact portion thereof to block the gap. Further, the hollow tubular bead can provide various advantages in that a hollow structure of the tubular bead can increase strength of the tubular bead itself and reduce compressive stress upon closure of an aperture with the opening/closing member.

The prior art technology disclosed in the published patent application, however, has a defect in that it requires complicated and large equipment for preparation of a mixture of a highly viscous material with gases.

Furthermore, the prior art technology has a structure wherein a flow of gaseous cores formed in the pressure drop area of the channel are likely to be influenced largely by flow characteristics of the foamable material. Therefore, the prior art technology also suffers from a disadvantage in that it is extremely difficult to align the hollow portion of the tubular bead regularly along an axis thereof. If a flow path of the foamable material would be curved or flow of the foamable material would become irregular, for example, the gaseous cores do not always flow along the axis of the tubular bead so that there may be an occasion that hollow portions of the tubular bead extending along the axis thereof are not formed in an ideal shape as intended. In addition, there may be an occasion that a resulting bead may be rendered poor in quality because a larger hollow portion may be formed if a gaseous core would be penetrated into a surrounding area of the tubular bead and then foam therein.

SUMMARY OF THE INVENTION

Therefore, the present invention has been accomplished in order to overcome or improve upon the foregoing defects present in the prior art technology, and it has an object to provide a method for molding a bead and an apparatus for performing the method for molding the bead, which can more stably mold a hollow bead or foamed bead of high quality having advantages in that they are low in compressive stress, lightweight, and high in strength, as comparable to conventional hollow beads, and that they have little or no defective portions.

The present invention has another object to provide a bead-molding method and apparatus so adapted as to comply with a large-scale production and flexible applications to versatile usages by readily allowing a bead to be automatically applied and molded into an irregular form onto a member, while conventional technology has otherwise applied manually to a member a foamed molding tape or a regular form of a hollow tubular bead.

Further, the present invention has another object to provide a method and an apparatus for molding a bead, which can accomplish each of the above objects of the present invention in a very simplified manner and with simplified structure.

In order to achieve the objects, the present invention in a first aspect provides a method for molding a hollow bead into a predetermined shape from a highly viscous material that is fluid in a high-speed flow region (during high speed flow) and high in an ability of retaining a shape into which it is formed in a low-speed flow region (during low speed flow). This bead-molding method comprises: a gas stream forming step for forming a gas stream flowing in one direction; a material stream forming step for forming a high speed flow of a highly viscous material stream in an outer peripheral space enclosing the gas stream; and a hollow bead molding step for molding a hollow bead into an irregular shape by reducing the high speed flow of the highly viscous material stream to its low speed flow, while fluidizing the highly viscous material flowing in the outer peripheral space enclosing the gas stream.

In the first aspect of the present invention, the gas stream flowing in the one direction is created in the gas stream forming step, and the highly viscous material stream flowing at a high speed flow through the outer peripheral space enclosing the gas stream is created in the material stream forming step. The highly viscous material stream is highly fluid or flowable when it is located in the high speed flow region, so that it can be molded into any optional form in a more flexible manner in the outer peripheral space enclosing and about the gas stream, for example, by changing direction of the highly viscous material stream. It is preferred, however, that the direction of the highly viscous material stream is a direction substantially parallel to the direction in which the gas stream flows, to say, in substantially the same direction.

In the hollow bead molding step in the first aspect, the highly viscous material stream flowing in the high-speed flow region can be molded into a given shape in a flexible manner by taking advantage of fluidity of the highly viscous material, and a shape of the highly viscous material stream into the highly viscous material was applied and molded is retained as it is as the high speed flow of the highly viscous material stream is dropped to the low-speed flow region and eventually to zero. At this instance, the gas stream flows at a central portion while fluidizing the highly viscous material into an irregular shape so as to maintain a status in which the highly viscous material is flowing around the gas stream. This configuration can mold a hollow bead into any optional shape that has its inner portion rendered hollow and a surrounding portion enclosed by the highly viscous material. This bead-molding step can readily mold, for instance, a hollow bead in a slenderly elongated tubular form and a curved hollow bead.

The present invention in a second aspect provides a method for molding a hollow bead from a foamable material for molding a foamed body, which comprises: a gas stream forming step for forming a gas stream flowing in one direction; a material stream forming step for forming a highly viscous material stream in an outer peripheral space enclosing the gas stream, with the highly viscous material stream flowing in the same direction as the direction of the gas stream; and a hollow bead molding step for molding a hollow bead into an irregular shape while foaming the foamable material flowing through the outer peripheral space.

In the second aspect of the present invention, the hollow bead can be molded into any optional shape by processes similar to the above processes in the first aspect, with the hollow bead having its inside rendered hollow and its surrounding portion enclosed with a foamed body.

The present invention in a third aspect provides a method for molding a hollow bead into a shape of an applying position by applying the hollow bead onto a member while following a path on the member, in the hollow bead molding step in the first and second aspects, respectively.

In the third aspect of the present invention, as the highly viscous material stream or the foamable material stream in the high speed flow region reaches the applying position, a flow speed of the material stream is rapidly reduced up to a low speed and eventually to zero. At the same time, a viscosity of the material stream is caused to increase rapidly and assumes a certain shape, to say, a shape in which the highly viscous material stream or the foamable material stream encloses the gas stream. Furthermore, the highly viscous material stream or the foamable material stream is set into that shape. As the highly viscous material stream or the foamable material stream is transferred in this state along and following the shape of the applying position, material is applied and molded into the shape that complies with the shape of the applying position.

Upon applying the material onto the member, the hollow bead applied and molded can be tacked or adhered to the member by using the highly viscous material or the foamable material having a tackiness or adhesive property, as in a fourth aspect of the present invention.

Further, in order to form one-way flow of the gas stream and the material stream flowing around the gas stream, a discharging device may be arranged and configured as in a fifth aspect of the present invention so as to perform methods as configured in the first to fourth aspects as described above. The discharging device has an inner nozzle elongated at a tip portion and an outer nozzle elongated so as to enclose an outer periphery of the inner nozzle. In this aspect, the gas stream forming step is preferably configured such that the gas stream is allowed to flow in one direction by discharging gases from the inner nozzle, and the material stream forming step is preferably configured discharging the highly viscous material or foamable material stream from the outer nozzle to form the material stream outside and around the gas stream in the same direction as the gas stream flows.

Moreover, in a sixth aspect as a preferred configuration of the third or fourth aspect as described above, a discharging device is provided which has an inner nozzle elongated at a tip portion and an outer nozzle elongated so as to enclose an outer periphery of the inner nozzle in accordance with the method in the third or fourth aspect of the present invention. In the gas stream forming step, gases are discharged from the inner nozzle to form a gas stream flowing in one direction. On the other hand, in the material stream forming step, the highly viscous material or the foamable material is discharged from the outer nozzle in the form of a stream that flows in the same direction as the gas stream flows while enclosing the gas stream. Further, in the bead molding step, the hollow bead is applied and molded into a shape corresponding to the shape of the applying position by transferring the inner nozzle and the outer nozzle along a predetermined locus following the shape of the applying position while discharging the highly viscous material or the foamable material onto the member.

In accordance with the present invention, the gas stream is formed to flow in the one direction and the highly viscous material stream is formed to flow in a high speed flow region about and enclosing the gas stream, while the highly viscous material stream is molded into a predetermined shape while slowing high speed flow of the highly viscous material stream down to low speed flow as the highly viscous material is being rendered fluid. Therefore, this aspect of the present invention can present advantages in that a hollow bead of high quality can be molded into an optional shape without any or less defects in a ready and stable manner. Moreover, the hollow bead can provide a sealing portion having an appropriate level of elasticity because it is hollow so that it is lightweight and requires only a small amount of stress upon compression.

It is noted herein, however, that the method for molding the hollow bead in the aspects as described above can also be applied to a seventh aspect and subsequent aspects where a foamed bead has its inner portion filled with a foamable material and its surrounding and outer portion covered or applied with highly viscous material.

In a seventh aspect of the present invention, there is provided a bead-molding method for molding a foamed bead into a given shape from a foamed body covered with highly viscous material that is fluid in the form of a stream in a high speed flow region and can retain its shape into which the highly viscous material is applied when it is in a low speed flow region. The bead-molding method in this aspect is composed of: a foamable material stream forming step for forming a foamable material stream flowing in one direction, which can form the foamed body; a material stream forming step for forming a highly viscous material stream in a high speed flow region within an outer peripheral space enclosing and about the foamable material stream; and a bead molding step for molding the foamed bead into an irregular shape by reducing high speed flow of the highly viscous material to low speed flow thereof while fluidizing the highly viscous material flowing around and about the foamable material stream and, at the same time, by foaming the foamable material.

In an eighth aspect, the foamed bead is molded into a given shape along and following a shape of the member by transferring the member along its shape while applying to the member the foamable material stream and the highly viscous material stream, in accordance with the seventh aspect.

The present invention in a ninth aspect is directed to a bead-molding step wherein a foamed bead applied and molded is tacked or adhered to a member by using highly viscous material being tacky or having an adhesive property tackiness.

In a tenth aspect of the present invention, the bead-molding method in one of the seventh to ninth aspects is modified in such a manner that: a discharging device is disposed which has an inner nozzle elongated at its tip portion and an outer nozzle elongated about and enclosing an outer periphery of the inner nozzle; the foamable material stream flowing in the one direction is formed by discharging the foamable material from the inner nozzle in the foamable material stream forming step; and the highly viscous material stream flowing in the same direction as the foamable material stream and about and enclosing the foamable material stream is formed by discharging the highly viscous material from the outer nozzle in the material stream forming step.

The present invention in an eleventh aspect is directed to the bead-molding method modified from the method in the eighth or ninth aspect, which includes a discharging device having an inner nozzle elongated at its tip portion and an outer nozzle elongated about and enclosing an outer periphery of the inner nozzle; with the foamable material stream forming step for forming the foamable material stream flowing in the one direction by discharging the foamable material from the inner nozzle; with the material stream forming step for forming the highly viscous material stream flowing in the same direction as the foamable material stream and about and enclosing the foamable material stream by discharging the highly viscous material from the outer nozzle; and with the bead molding step for molding the foamed bead into a given shape corresponding to the shape of the member by transferring the discharging device along a predetermined locus following the shape of the member while discharging the foamable material stream and the highly viscous material stream from the inner nozzle and the outer nozzle, respectively, onto the member.

In accordance with any one of the seventh to eleventh aspects of the present invention, there are formed the foamable material stream flowing in the one direction and the highly viscous material stream flowing in the high-speed flow region while enclosing the foamable material stream in such a way that the foamed bead is molded by transferring the highly viscous material stream in the high-speed flow region to the low-speed flow region while rendering the highly viscous material fluid. Therefore, the method according to this aspect can present advantages in that a foamed bead of high quality can be molded into an optional shape without any or less defects in a ready and stable manner. Moreover, the foamed bead is of a hollow foamed body so that the foamed bead can provide a sealing section that is lightweight, and has a small stress against compression as well as an appropriate level of softness. Furthermore, the foamed bead can provide the foamed body with improved waterproof, airtight and shock absorbing performance, as compared with a foamed body made of a conventional bead that is not covered or enclosed with any highly viscous material.

Further, the discharging device in the sixth or eleventh aspect can be used as a system for automatically applying and molding the hollow bead or the foamed bead. Moreover, as in a twelfth aspect, the discharging device can be mounted on a manipulator disposed movable to a desired position in response to a control signal, and the bead-molding step is arranged to automatically apply and mold the hollow bead or the foamed bead on a member of plural members one after another being carried on a manufacturing line by controlling a discharging position of the discharging device by operation of the manipulator.

Furthermore, in the twelfth aspect, it is preferred to control the manipulator so as to bring an actually applying position of a member and a bead discharged by the discharging device substantially into agreement with a predetermined target applying position by detecting the actual applying position thereof, as in a thirteenth aspect of the present invention. This control enables applying a hollow bead or a foamed bead at accurate positions following the member.

Moreover, in the twelfth or thirteenth aspect, it is preferred to automatically decide whether the bead is applied and molded in a favorable fashion by picking up an image of the bead applied and molded in a favorable fashion and comparing this picked-up image of the bead with a prestored reference image of the bead applied and molded in a favorable fashion, as in a fourteenth aspect.

By enabling an automatic decision on the bead molded in a favorable fashion, an operator can immediately determine a bead having defects so that he can perform a subsequent proceeding without delay.

Further, in any one of the twelfth to fourteenth aspects, it is preferred to use an opening closing member capable of opening and closing a given opening as the member, as in a fifteenth aspect.

In the fifteenth aspect, it is further preferred to apply and mold a hollow bead or a foamed bead on the member and form a sealing section between the opening and the opening/closing member, as in a sixteenth aspect, with the member being at a site nearby and along an edge portion of the opening/closing member.

In the sixteenth aspect, a foamed body with its inside rendered hollow or rich with gaseous bubbles is used, so that a sealing section becomes lightweight and has a small amount of stress against compression as well as has an appropriate level of elasticity. These properties can provide the sealing section with improved sealing performance when the opening/closing member is closed, and provide for easy operations for opening and closing the opening/closing member.

As described above, in each of the twelfth to sixteenth aspects of the present invention, the hollow bead or the foamed bead can be applied and molded into any optional shape on the member automatically, so that the bead-molding method according to the present invention can deal with a large-scale production of molded members and versatile requirements for applications.

Next, a description will be given below regarding a bead-molding apparatus for conducting the bead-molding method as in the following seventeenth to thirtieth aspects of the present invention.

For a bead-molding apparatus for molding a hollow bead as in a seventeenth aspect of the present invention, the apparatus includes: a discharging device having an inner nozzle elongated at its tip portion, an outer nozzle elongated about and enclosing an outer periphery of the inner nozzle, a first inlet connected with the inner nozzle, and a second inlet connected with the outer nozzle; a gases feed unit for feeding gases to the discharging device through the first inlet; and a material feed unit for feeding a highly viscous material or a foamable material to the discharging device through the second inlet, with the highly viscous material being fluid in the form of a stream in a high speed flow region, and capable of retaining a shape into which the material is molded in a low speed flow region. As in the seventeenth aspect of the present invention, the apparatus of molding the hollow bead can be realized with such a very simple structure.

In an eighteenth aspect, the bead-molding apparatus of the present invention includes: a discharging device including an inner nozzle disposed extending at a tip portion, an outer nozzle disposed extending about and enclosing an outer periphery of the inner nozzle, a first inlet connected with the inner nozzle, and a second inlet connected with the outer nozzle; a foamable material feed unit for feeding a foamable material to the discharging device through the first inlet; and a material feed unit for feeding a highly viscous material to the discharging device through the second inlet, with the highly viscous material being fluid in the form of a stream in a high speed flow region and capable of retaining a shape into which it is molded in a low speed flow region.

For the foamable material feed unit in the eighteenth aspect, it is preferred to feed a mixture of gases with the highly viscous material as the foamable material, as in a nineteenth aspect.

As in a twentieth aspect of the present invention, the foamable material feed unit in the nineteenth aspect includes: a plurality of piston pumps arranged so as to perform a suction stroke and a extrusion stroke by reciprocally moving a piston in a cylinder; a foaming gas injection unit for injecting gases under a predetermined pressure into the cylinder; and a pump control unit for controlling the plurality of the piston pumps in such a manner that each of the plurality of the piston pumps is arranged to conduct the suction stroke for feeding gases with the highly viscous material after the suction stroke, and to conduct the extrusion stroke for discharging the mixture of the gases with the highly viscous material as the foamable material, as well as that a time difference is provided for the extrusion stroke of each of the plurality of the piston pumps so as to continually discharge a predetermined quantity of the foamable material.

In the present invention in the twentieth aspect, a cylinder pump of a predetermined flow rate is used, and the gases are first introduced followed by introduction of the highly viscous material, so that a pressure of the gases can be rendered lower and the highly viscous material can be mixed with the gases at an accurate mixing rate. Furthermore, plural cylinder pumps each having a predetermined flow rate are arranged with a time difference so that they can discharge the mixture continually at a predetermined quantity in accordance with given control procedures, thereby enabling applying and molding a foamed bead in a uniform and even manner.

Further, in a twenty-first aspect of the present invention, the foamable material feed unit is further provided with a dispersing tubular path for dispersing minute gaseous bubbles during a discharging process.

Moreover, in the twenty-first aspect, as the mixture is passing through the dispersing tubular path, a relative speed difference is caused to occur between a central portion and a peripheral portion, i.e., a portion close to an inner wall section of the tubular path. This relative speed difference assists in dispersing the gaseous bubbles in the mixture into more fine particle, and this mechanism can further improve quality of a foamed bead.

In the present invention in a twenty-second aspect, the discharging device as in each of the seventeenth to twenty-first aspect is configured such that a variation of each of the inner nozzle and the outer nozzle in terms of inner wall diameter becomes smaller over a length extending from a connection end section with a body of the discharging device to the tip portion with a predetermined inner dimension.

In the twenty-second aspect of the present invention, a variation in the inner wall diameter is defined to become smaller, so that a loss in pressure of a material stream within the nozzle can be minimized under given conditions of a nozzle size.

A twenty-third aspect of the present invention is characterized by the inner nozzle and the outer nozzle of the discharging device in each of the seventeenth to twenty-second aspects, each of which has an outer nozzle wall portion containing an outermost edge section comprised of an slant surface joining at an acute angle with respect to a direction in which the highly viscous material or the foamable material is discharged.

More specifically, in the twenty-third aspect, the outer wall portion of the nozzle containing the outermost edge section is inclined at an acute angle with respect to flow of the material stream, so that the material becomes unlikely to be adsorbed at the outer nozzle wall portion while the material is being discharged from a nozzle outlet.

In a twenty-fourth aspect, the present invention in each of the seventeenth to twenty-third aspect is characterized by a first control valve and a second control valve for controlling opening and closing of passages extending from the first inlet to the inner nozzle and from the second inlet to the outer nozzle, respectively, with the first and second control valves being disposed in corresponding passages.

The first and second control valves in this aspect may be opened and closed, for example, by a pneumatic cylinder, a hydraulic cylinder or an electrically-drivable motor.

Further, in a twenty-fifth aspect, the discharging device in the twenty-fourth aspect can be hand-carried and the first and second control valves can be opened and closed by manual on-off operations.

These configurations allow an operator to operate the bead-molding apparatus manually. Therefore, the hollow bead or the foamed bead can be applied without much difficulty even at a very narrow place where a large-size manipulator cannot be used for application.

Moreover, in order to automatically control discharging of a bead by the discharging device, a twenty-sixth aspect of the present invention is configured such that the first and second control valves as in the twenty-fourth aspect are arranged so as to be opened and closed in response to an instruction signal.

The present invention in a twenty-seventh aspect is characterized in that the discharging device in the twenty-sixth aspect is mounted on a top portion thereof and is further provided with a manipulator disposed so as to be movable to a desired position in response to a control signal, and with a control unit for automatically controlling movement of the manipulator and discharging of the discharging device in accordance with a predetermined program.

In a twenty-eighth aspect, the control unit in the twenty-seventh aspect is arranged so as to automatically control movement of the manipulator and discharge of the discharging device so as to automatically apply and mold a hollow bead or a foamed bead on a member of each of a plurality of members being carried on a manufacturing line one after another.

The present invention in the twenty-eighth aspect can realize a system suitable for automatically applying and molding a hollow bead or a foamed bead of high quality on the members on a large scale.

Further, in the twenty-eighth aspect, it is preferred as in a twenty-ninth aspect of the present invention that the discharging device is further provided with a detection unit for detecting an actual applying position of the bead onto the member by the discharging device, and that the control unit is arranged to control the manipulator so as for the actual applying position thereof to be brought substantially into agreement with a predetermined target on the member.

Moreover, as in a thirtieth aspect, it is preferred that the apparatus in the twenty-ninth aspect is further provided with an image pick-up unit for picking up an image of a bead applied and molded on the member, and that the control unit is arranged to automatically decide whether the bead is applied and molded in a favorable fashion by comparing a picked-up bead image with a pre-stored reference image of a bead applied and molded in a favorable fashion.

It is to be noted herein that the present invention in each of the above aspects can be extended to a method and an apparatus wherein a hot melt material is used whose fluidity can be controlled by temperature, in place of flow speed.

For instance, the present invention in a thirty-first aspect is directed to: a bead-molding method for molding a hollow bead from a hot melt material that is fluid in the form of a stream in a middle-high temperature region and can retain a shape into which the bead is molded in a middle-low temperature region, and the bead-molding method comprises a gas stream forming step for forming a gas stream flowing in one direction; a material stream forming step for forming a hot melt material stream in the middle-high temperature region within an outer peripheral space about and outside so as to enclose the gas stream; and a bead molding step for molding the hollow bead into an irregular shape by cooling the middle-high temperature of the hot melt material to the middle-low temperature while fluidizing the hot melt material flowing in the outer peripheral space about the gas stream.

In the thirty-first aspect of the present invention, the gas stream is formed during the gas stream forming step and the stream of the hot melt material is formed on an outer peripheral side about and enclosing the gas stream in the material stream forming step. The hot melt material stream is highly fluid in the middle-high temperature region, so that the hot melt material can be applied and molded flexibly into a given shape by taking advantage of this high fluidity, and molded into a given shape as it was by cooling a temperature of the hot melt material from the middle-high temperature region to the middle-low temperature region.

It is to be noted herein that the middle-high temperature region as referred to herein means to include a temperature range from approximately 60° C. (333 K) to approximately 200° C. (473 K), and the middle-low temperature region as referred to herein means to include a temperature range from room temperature to approximately 150° C. (423 K) Further, it is preferred that there is a temperature difference between the middle-high temperature region and the middle-low temperature region by at least approximately 5° C.

It should further be noted herein that the present invention in the aspect relating to the hot melt material can also be used in a similar manner for a foamable hot melt material obtainable by foaming the hot melt material.

Therefore, the present invention in a thirty-second aspect is directed to a bead-molding method for molding a hollow bead from the foamable hot melt material for forming a foamed body, and the bead-molding method may comprise: a gas stream forming step for forming a gas stream flowing in one direction; a material stream forming step for forming a foamable hot melt material stream flowing in the same direction as the gas stream within an outer peripheral space about and outside so as to enclose the gas stream; and a bead molding step for molding a hollow bead into an irregular shape by foaming the foamable hot melt material flowing in the outer peripheral space about the gas stream.

In a thirty-third aspect, the present invention in the thirty-first aspect or the thirty-second aspect is characterized in that the hollow bead is applied and molded into a shape corresponding to and following the shape of the member by transferring the hot melt material stream or the foamable hot melt material stream along and following the shape of the member while applying the material stream onto the member during the bead-molding step.

The present invention in a thirty-fourth aspect is characterized in that, in the thirty-third aspect, a discharging device is disposed which has an inner nozzle elongated at its tip portion and an outer nozzle elongated about and enclosing an outer periphery of the inner nozzle; the gas stream forming step is to form the gas stream flowing in one direction by discharging gases from the inner nozzle; the material stream forming step is to form the hot melt material stream or the foamable hot melt material stream in the same direction as the gas stream so as to enclose the gas stream by discharging the hot melt material or the foamable hot melt material from the outer nozzle; and a bead-molding step for molding the hollow bead into a shape corresponding to and following the shape of the member by transferring the material stream along a given locus while discharging the gas stream and the material stream toward and onto the member from the inner and outer nozzles, respectively.

Moreover, the present invention in a thirty-fifth aspect is directed to a bead-molding method for molding a foamed bead comprised of a foamed body covered with a hot melt material that is fluid in the form of a stream in a middle-high temperature region and can retain a shape into which it is molded in a middle-low temperature region, and the bead-molding method comprises: a foamable material stream forming step for forming a stream of a foamable hot melt material for forming the foamed body; a material stream forming step for forming a stream of the hot melt material flowing in the middle-high temperature region within an outer peripheral space of the foamable hot melt material stream about and enclosing the foamable hot melt material stream; and a bead-molding step for molding the foamed bead into an irregular shape by cooling the middle-high temperature region to the middle-low temperature region while fluidizing the hot melt material stream flowing along the outer peripheral side outside and about the foamable hot melt material stream and foaming the foamable hot melt material.

In a thirty-sixth aspect, the present invention is characterized in that the bead-molding step in the thirty-fifth aspect is further arranged so as to mold the foamed bead into a shape corresponding to and along the shape of the member by applying the hot melt material stream or the foamable hot melt material stream onto the member while transferring the material stream along and following the shape of the member.

In a thirty-seventh aspect, the present invention in the thirty-fifth or thirty-sixth aspect is configured such that a discharging device is disposed which has an inner nozzle elongated at a tip portion thereof and an outer nozzle elongated about and enclosing an outer periphery of the inner nozzle, wherein the foamable stream forming step forms the foamable hot melt material stream in the one direction by discharging the foamable hot melt material from the inner nozzle; and the material stream forming step forms the hot melt material stream in the same direction of the direction of the foamable hot melt material stream and encloses the foamable hot melt material by discharging the hot melt material from the outer nozzle.

The present invention in a thirty-eighth aspect includes a discharging device including an inner nozzle elongated at a tip portion thereof and an outer nozzle elongated enclosing an outer periphery of the inner nozzle; wherein the foamable stream forming step forms the foamable hot melt material stream in the one direction by discharging the foamable hot melt material from the inner nozzle; the material stream forming step forms the hot melt material stream in the same direction as the direction of the foamable hot melt material stream by discharging the hot melt material from the outer nozzle; and the bead molding step for molding the foamed bead into a shape corresponding to and following the shape of the member by transferring the material stream along a given locus while discharging the foamable hot melt material from the inner nozzle and the hot melt material the outer nozzle, respectively.

Further, in a thirty-ninth aspect, the bead molding method in the thirty-seventh or thirty-eighth aspect is characterized in that the discharging device is mounted on a manipulator disposed to be movable to a desired position in response to a control signal, and in the bead molding step, the hollow bead or the foamed bead is automatically applied and molded on the applying position of a plurality of members being carried on a manufacturing line one after another by controlling a discharging position of the discharging device by operation of the manipulator.

The present invention in a fortieth aspect provides a bead molding apparatus for forming a hollow bead, which includes a discharging device comprised of: an inner nozzle elongated at a tip portion thereof, an outer nozzle elongated about and enclosing an outer periphery of the inner nozzle, a first inlet connected with the inner nozzle, and a second inlet connected with the outer nozzle; a gases feed unit for feeding gases to the discharging device through the first inlet; and a material feed unit for feeding a hot melt material or a foamable hot melt material to the discharging device through the second inlet, with the hot melt material being fluid in the form of a stream in a middle-high temperature region, and capable of retaining a shape into which the material is molded in a middle-low temperature region.

Moreover, the present invention in a forty-first aspect is directed to a bead molding apparatus for forming a foamed bead and characterized in that the apparatus includes a discharging device comprised of: an inner nozzle elongated at a tip portion thereof, an outer nozzle elongated about and enclosing an outer periphery of the inner nozzle, a first inlet connected with the inner nozzle, and a second inlet connected with the outer nozzle; a first material feed unit for feeding a foamable hot melt material to the discharging device through the first inlet; and a second material feed unit for feeding a hot melt material to the discharging device through the second inlet, with the hot melt material being fluid in the form of a stream in a middle-high temperature region and capable of retaining a shape into which the material is molded in a middle-low temperature region.

In a forty-second aspect, the present invention is characterized in that the first material feed unit feeds a mixture of gases with the hot melt material as the foamable hot melt material in the forty-first aspect of the present invention.

Other objects, features and advantages of the present invention will become apparent in the course of the following description with reference to the accompanying drawings.

BRIEF DESCRIPTION OF THE DRAWINGS

The present invention will be understood more clearly by the following detailed description of each of embodiments of the present invention with reference to the accompanying drawings.

FIG. 4 is an exploded view showing parts of the nozzle of FIG. 3.

FIGS. 7(a) and 7(b) are views for description of a process for applying and molding a hollow bead; wherein FIG. 7(a) is a schematic view showing the applying and molding process and FIG. 7(b) is perspective and sectional view showing a hollow bead formed by the applying and molding process.

FIGS. 8(a) and 8(b) are plan views of an opening/closing member for a control board as a member onto which a hollow bead can be applied by the automatic hollow bead applying and molding system according to the first embodiment of the present invention; wherein FIG. 8(a) is directed to the control board before applying and FIG. 8(b) is directed to the control board after applying.

DETAILED DESCRIPTION OF THE PREFERRED EMBODIMENTS

The present invention will be described in more detail by way of embodiments with reference to the accompanying drawings.

First Embodiment

Figure 1:
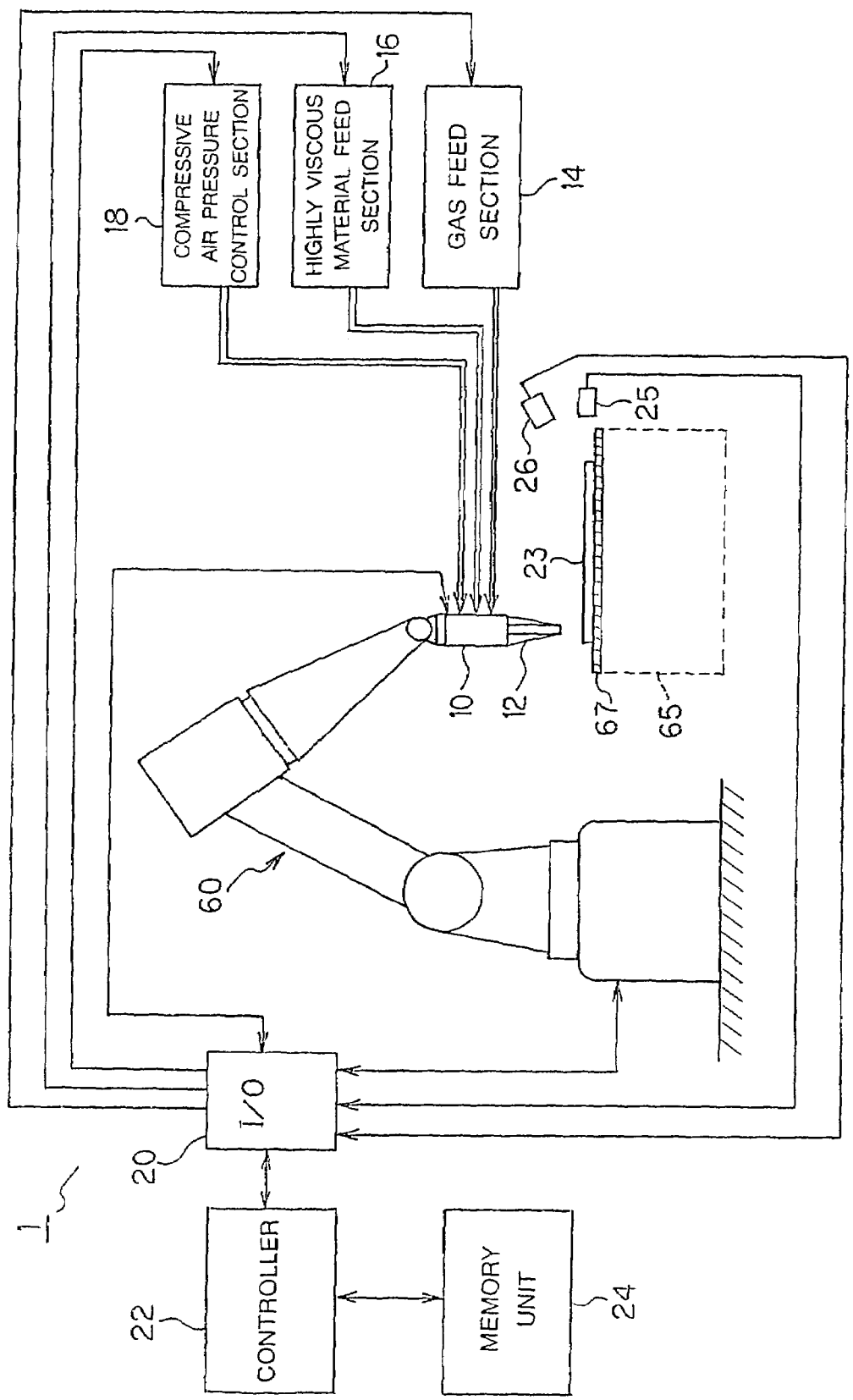
FIG. 1 is an illustration showing an outline configuration of an automatic bead applying and molding system in accordance with a first embodiment of the present invention.

FIG. 1 shows an outline configuration of a system for automatically applying and molding a hollow bead in accordance with a first embodiment of the present invention. The system is adapted to apply and mold the hollow bead suitable on a large scale for use in automatically applying and molding the hollow bead along an edge portion of a work for a control board.

In FIG. 1, there is shown a system 1 for automatically applying and molding the hollow bead, which includes a discharging device 10 for discharging feed gases and a highly viscous material from a nozzle 12 to form a hollow bead, a gases feed section 14 for feeding the gases to the discharging device 10, a highly viscous material feed section 16 for feeding the highly viscous material to the discharging device 10, with the highly viscous material being fluid in the form of a stream in a high speed flow region and can retain a shape into which it is molded in a low speed flow region, and a compressive air control section 18 for controlling opening and closing of a discharging valve (as will be described later), disposed inside the discharging device 10, by feeding compressive air to the discharging device 10 and controlling compressive air pressure therein.

In order to adapt the discharging device 10 to automatic applying and molding on a large scale, the discharging device 10 is mounted on a tip portion of a manipulator 60 through a flange or any other suitable part, with the manipulator 60 being arranged so as to transfer a tip portion thereof to a desired position located within a predetermined range in response to a control signal. The bead applying and molding system 1 may include a belt conveyor 65, a detection sensor 25, an image pick-up sensor 26, a controller 22, a memory unit 24, and an I/O port 20. The belt conveyor 65 can carry plural opening/closing members 23 loaded on an endless belt 67 one after another to a predetermined applying position at which the hollow bead can be applied to opening/closing member 23. The detection sensor 25 can detect the predetermined applying position at which the opening/closing member 23 loaded on the belt conveyor 65 is to have applied thereto the hollow bead. The image pick-up sensor 26 can pick up images of the opening/closing member 23 and the hollow bead applied and molded on the opening/closing member 23. The controller 22 can control and manage entire operations of the bead applying and molding system 1. The memory unit 24 is to store data necessary for applying and molding the hollow bead. The I/O port 20 can control input and output interfaces between the controller 22 and other structuring elements.

These structuring elements can be realized by known technology. For instance, the detection sensor 25 may be configured as a combination of a light emitting diode (LED) capable of emitting light to the predetermined applying position with a phototransistor disposed so as to detect light emitted from the LED. With this configuration of the detection sensor 25, the phototransistor can detect blocking of passage of light from the LED by the opening/closing member 23 so that the blocking of the light passage may be determined as a location of the opening/closing member 23 in the predetermined applying position. Further, the image pick-up sensor 26 may be comprised of a CCD (charge coupled device). Moreover, the controller 22 may be composed of a micro-processor or a personal computer, for example, which can perform various kinds of processing including image analysis using CCD images and a so-called PI (proportional-plus-integral) control.

Next, a description will be given regarding detailed structure of the discharging device 10 with reference to FIGS. 2 to 4.

Figure 2:
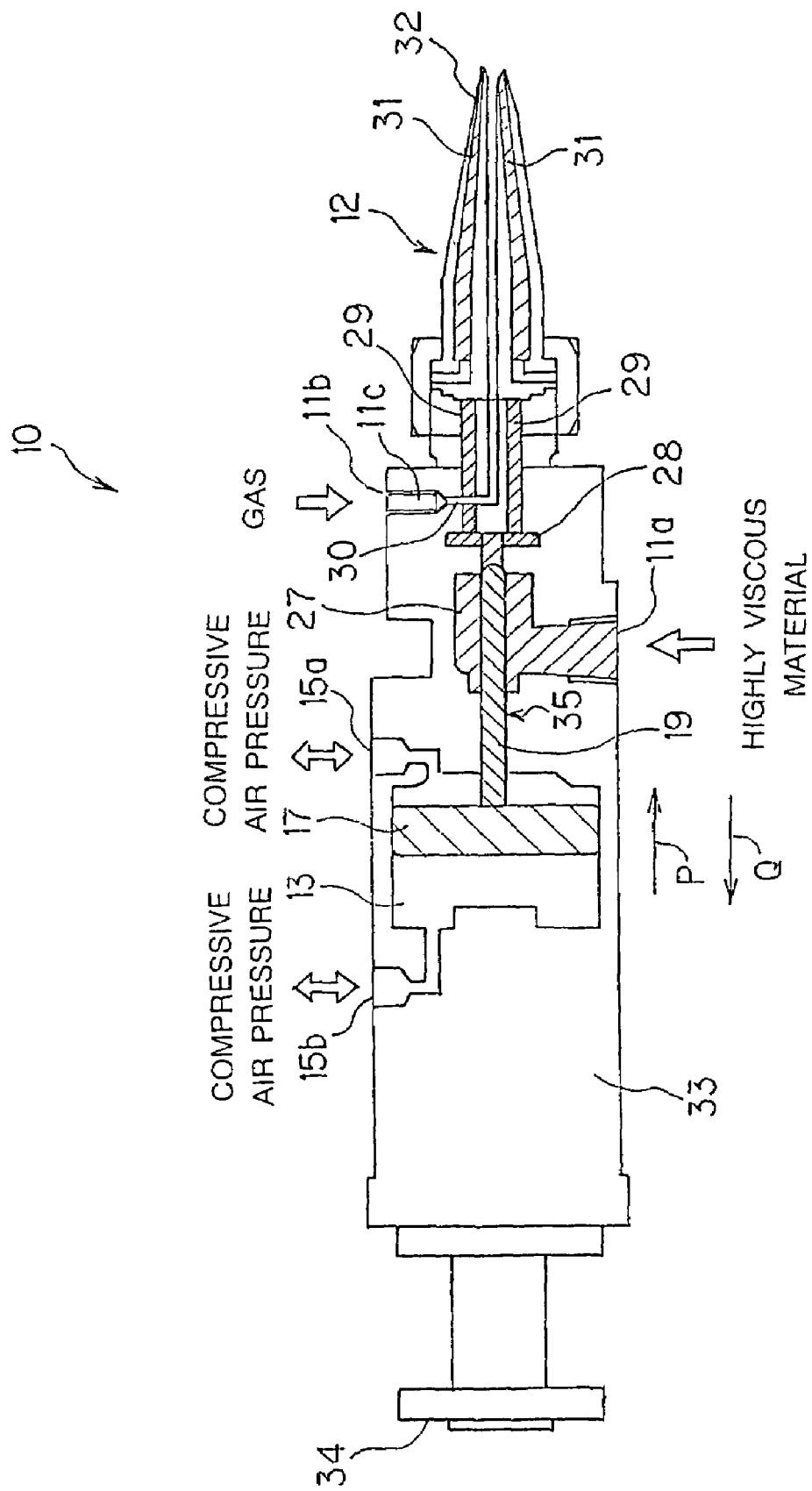
FIG. 2 is a sectional view showing an inner structure of a discharging device of the automatic bead applying and molding system in accordance with the first embodiment of the present invention.

FIG. 2 is a sectional view showing the discharging device 10. As shown in FIG. 2, the discharging device 10 has a discharging unit for discharging a highly viscous material, including a pneumatic cylinder 13 disposed in a body 33 thereof, a piston 17 disposed to reciprocally move within the pneumatic cylinder, a rod 19 elongated from a surface at a nozzle side of the piston, a material inlet 11a connected to the highly viscous material feed section 16 (FIG. 1), a material chamber 27 for storing the highly viscous material fed from the material inlet before discharging, a valve path 28 formed from and through a side portion of the chamber at its nozzle side, an inner material path 29 branched from the valve path up to a base portion of the nozzle 12, and a material nozzle line 31 elongated from the inner material path 29 up to a tip portion of the nozzle.

The body 33 of the discharging device 10 has compressive air pressure feed inlets 15a and 15b through which compressive air pressure is fed from an exterior into the body. The feed inlets 15a and 15b are disposed, respectively, connecting with positions close to a top dead center of the pneumatic cylinder 13 and a bottom dead center thereof. The compressive air pressure feed inlets 15a and 15b are connected to the compressive air pressure control section 18 (FIG. 1) through a pneumatic line, and controlled to feed air from the compressive air pressure control section 18. As the compressive air pressure fed to the compressive air pressure feed inlet 15a is decreased while the compressive air pressure fed to the compressive air pressure feed inlets 15b is increased, the piston 17 is moved in a direction indicated by arrow P and reaches the top dead center. On the contrary, as the compressive air pressure fed to the compressive air pressure feed inlet 15a is increased while the compressive air pressure fed to the compressive air pressure feed inlets 15b is decreased, the piston 17 is moved in a direction indicated by arrow Q and reaches the bottom dead center. As described above, the piston 17 is controlled by the compressive air pressure control section 18 so as to reciprocally move between the top dead center and the bottom dead center of the pneumatic cylinder 13.

The rod 19 is disposed in a rod hole 35 extending and connecting between the pneumatic cylinder 13 and the material chamber 27 inside the body portion, and a tip portion of the rod 19 is elongated in the material chamber 27. As the piston 17 moves in the direction P and approaches the top dead center, a tip portion of the rod 19 is allowed to enter into the valve path 28 and assume a state as indicated in FIG. 2, thereby blocking passage of the highly viscous material from the material chamber 27 to the nozzle 12. In other words, the highly viscous material fed is caused to stay within the material chamber 27 and cannot be discharged from the nozzle 12. On the other hand, as the piston 17 moves in the direction Q and approaches the bottom dead center, the tip portion of the rod 19 is released from the valve path 28 and the passage of the highly viscous material from the material chamber 27 to the nozzle 12 is opened. Therefore, the highly viscous material fed can be discharged from the material chamber 27 through inner material path 29 and the nozzle line 31 into the nozzle 12, followed by discharging the highly viscous material from the nozzle 12.

The discharging device 10 has a gas discharging unit including a gas inlet 11b connected to the gas feed section 14 (FIG. 1) for receiving supply of gases therefrom, an inner gas path 30 for allowing passage of the gases fed from the gas inlet 11b within the body thereof, and a gas nozzle line 32 disposed in the nozzle 12 and connected to the inner gas path 30. The inner path of the gas inlet 11b is provided with a gas control valve 11c for controlling opening and closing of the gas inlet 11b. As the gas control valve 11c is opened, the gases fed from the gas feed section 14 are discharged from a tip of the nozzle 12 through the inner gas path 30 and the gas nozzle line 32. On the contrary, although a matter of course, as the gas control valve 11c is closed, the gases fed therefrom are not discharged from the nozzle 12. The gas control valve 11c may be controlled so as to be opened and closed by operation of an electrically-driven motor (not shown) or any other suitable unit.

Further, the discharging device 10 is provided with a flange 34 at its rear end portion, and the discharging device 10 is mounted on the manipulator 60 through the flange 34.

Figure 3:
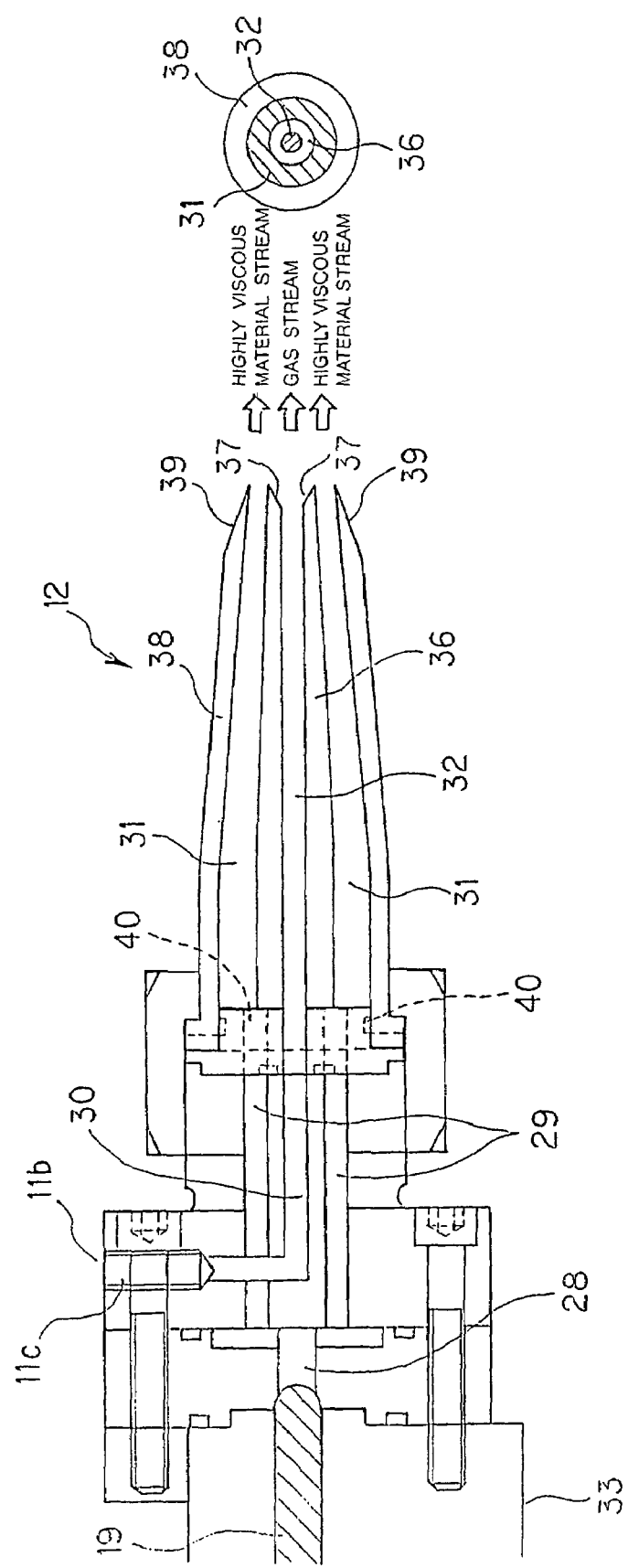
FIG. 3 is a sectional view showing details of structure of a nozzle and a part around the nozzle of the discharging device of FIG. 2.

FIG. 3 shows details on a sectional view of the nozzle 12. As shown in FIG. 3, the nozzle 12 is of a double nozzle structure consisting of an inner nozzle 36 elongated slenderly over an entire length thereof so as to allow discharging of the gases in one direction, and an outer nozzle 38 elongated slenderly over an entire length thereof so as to allow discharging of the highly viscous material in a pressurized state in the one direction. The gas nozzle line 32 is disposed inside the inner nozzle 36, and the material nozzle line 31 is interposed between an outer wall of the inner nozzle 36 and an inner wall of the outer nozzle 38 enclosing the material nozzle line 31. In order to reduce a loss in pressure upon supply of the highly viscous material under pressure, an inner wall of the material nozzle line 31 is rendered very smooth and is formed so as to make a variation in an inner line dimension smaller. In order to do this, for instance, the inner wall of the material nozzle line 31 may be formed so as to compensate a difference in dimension between a size of the nozzle at its tip predetermined to adapt to a size of the hollow bead and a size of a connection portion between the nozzle 12 and the body 33 for a fine variation in dimension at any portion of the nozzle over its entire nozzle length. The gas nozzle line 32 is set to become identical in size over the entire nozzle length.

Moreover, the outer nozzle 38 is provided with a slanting surface 39 so as to intersect with an outer wall portion extending rearward from an outermost tip at an acute angle with respect to the direction of discharging the highly viscous material. On the other hand, the inner nozzle 36 is provided with a slanting surface 37 so as to intersect with an inner wall portion extending rearward from an outermost tip thereof at an acute angle with respect to the direction of discharging the highly viscous material. As these slanting surfaces 37 and 39 are formed each at an acute angle with respect to the direction in which a highly viscous material stream discharged from the outer nozzle 38 flows, an occurrence of dragging of the highly viscous material due to high viscosity of the highly viscous material attached to a discharging outlet can be prevented, thereby resulting in reduction in a loss in pressure.

As shown in FIG. 3, each of the discharging paths 31 and 32 of the nozzle 12 is of a coaxially circular form in section when taken in a direction perpendicular to an axis of the nozzle.

FIG. 4 shows parts of the nozzle 12. As shown in FIG. 4, a structuring portion containing the inner nozzle 36 and the outer nozzle 38 may be divided into two structuring parts, with one structuring part being an inner nozzle part 45a and the other structuring part being an outer nozzle part 45b. The inner nozzle part 45a may be composed of the inner nozzle 36 in the form of a truncated cone, and a flange portion 42 connecting the inner nozzle 36 to the body 33. The flange portion 42 may include a plurality of apertures 40 through which the highly viscous material can be discharged to the material nozzle line 31 when they are aligned with a plurality of apertures of the inner material path 29, and further include a raised portion 46 and two cut portions 41 and 41, with the raised portion 46 being raised from the flange portion 42 so as to engage with a base section of the outer nozzle 38, and with the two cut portions 41 and 41 being formed in the raised portion 46.

On the other hand, the outer nozzle part 45b includes the outer nozzle 38 in the form of a truncated cone with its inside rendered hollow, a flange portion 43 formed at a base section of the nozzle, and two projection portions 44 and 44 formed projecting inwardly from an inner periphery of the flange portion 43.

The outer nozzle part 45b is joined with the inner nozzle part 45a by aligning the two projection portions 44 and 44 of the flange portion 43 of the outer nozzle part with corresponding cut portions 41 and 41 of the inner nozzle part 45a. As the inner nozzle part 45a is joined with the outer nozzle part 45b, the inner nozzle 36 is covered as a whole with the outer nozzle 38, and the material nozzle line 31 is defined as a space or clearance between the outer wall of the inner nozzle 36 and the inner wall of the outer nozzle 38. Therefore, the material nozzle line 31 is disposed about and enclosing the gas nozzle line 32.

Figure 5:
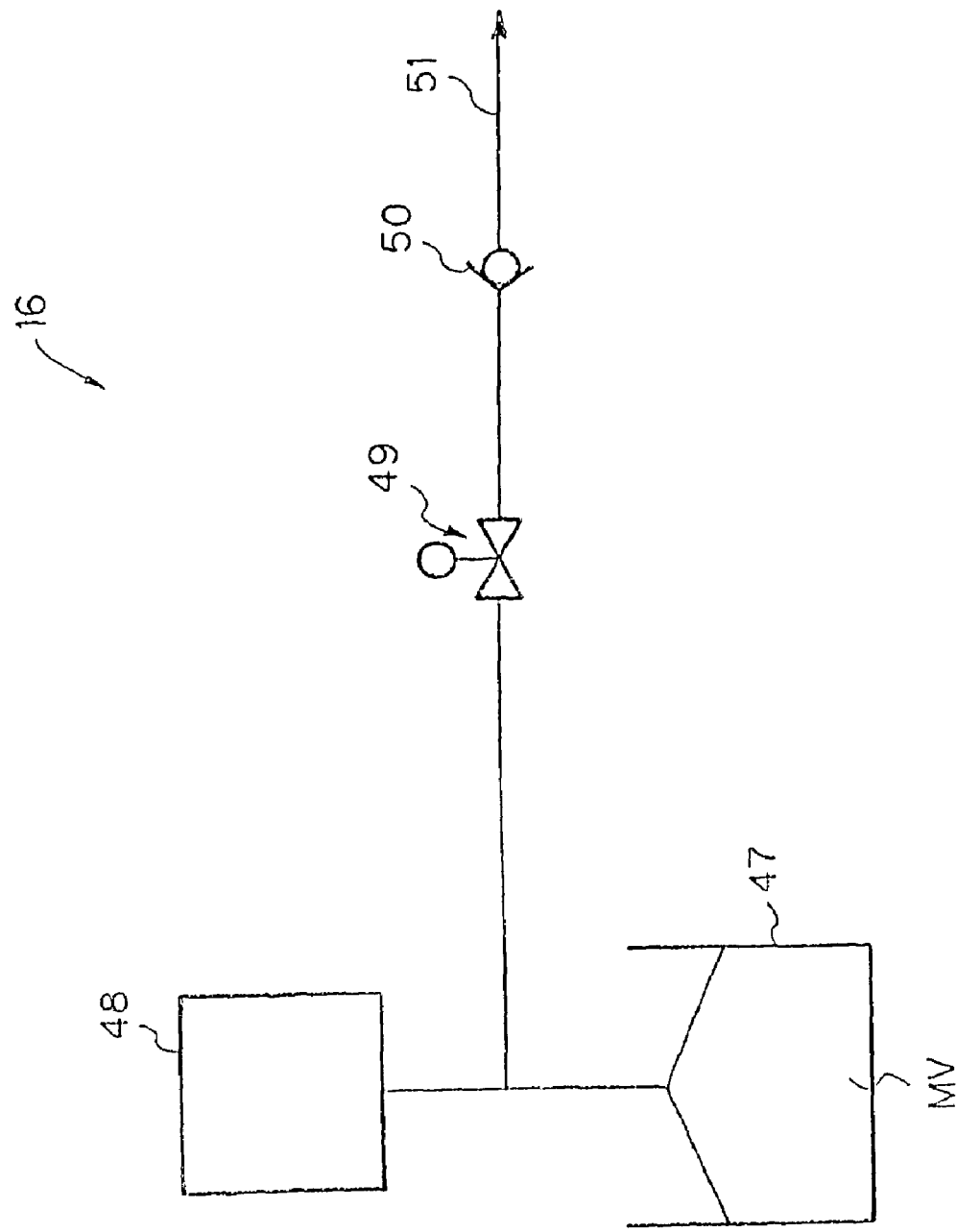
FIG. 5 is a block diagram showing a specific configuration of a highly viscous material feed unit for use with the automatic hollow bead applying and molding system according to the first embodiment of the present invention.

The highly viscous material feed section 16 of FIG. 1 can be realized in a very simple configuration as shown in FIG. 5. In FIG. 5, the highly viscous material feed section 16 may comprise a storage can 47 for storing the highly viscous material, a pump 48 for discharging a given flow amount of the highly viscous material stored in the storage can 47, a valve 49 for opening and closing a path through which a discharged highly viscous material stream flows, a check valve 50 for preventing a return flow of the highly viscous material stream, and a tubular line 51 connected to the material inlet 11a of the discharging device 10. The pump 48 may include, for example, a plunger pump of a floor plate type.

It is to be noted herein that the highly viscous material to be stored in the storage can 47 may preferably include a highly viscous material selected from highly viscous materials that are fluid and flowable and have a low dynamic viscosity in a high speed flow region, on the one hand, and have a high static viscosity and exhibit a high ability to retain a shape into which they are molded in a low speed flow region, on the other hand. Therefore, the pump 48 is arranged to select its discharging pressure so as to discharge the highly viscous material fed to the discharging device 10 at a high speed.

When it is desired that the hollow bead is tacky or adhered to member 23 of a control board as in this embodiment, a highly viscous material having a tackiness or adhesive property is selected for a portion where it is to be tacked or adhered to the member 23 when cured, while a highly viscous material having no tackiness or adhesive property is selected for a portion where it is not to be tacked or adhered to the member 23. It is also possible to use a highly viscous material having no tackiness or adhesive property; however, when an applying position of the member 23 is pre-applied with an adhesive the highly viscous material is discharged onto the applying position with the adhesive pre-applied thereon.

Figure 6:
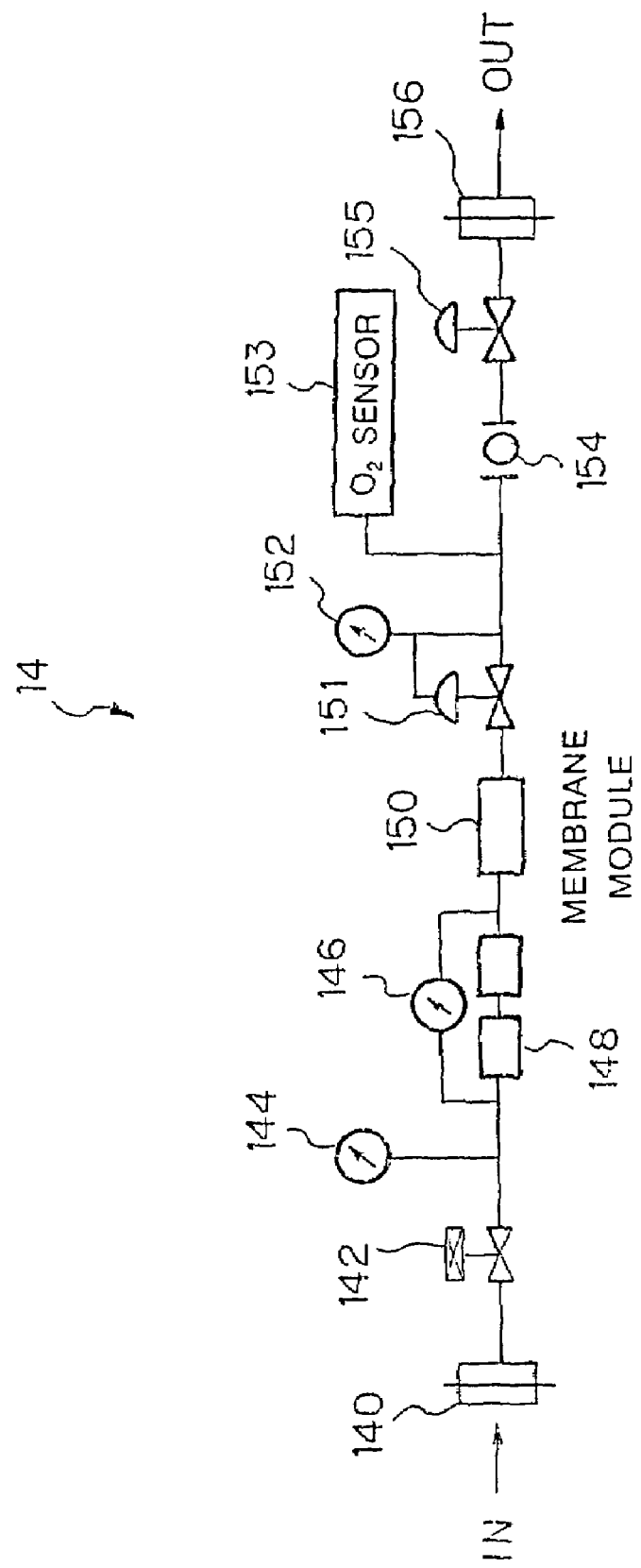
FIG. 6 is a block diagram showing a specific configuration of a gases feed unit for use with the automatic hollow bead applying and molding system according to the first embodiment of the present invention.

The gas feed section 14 of FIG. 1 may be a gas feed device 14, for example, as indicated in FIG. 6. Nitrogen gas feed device 14 may consist of an input port 140 through which compressed air is fed, an electromagnetic valve 142 capable of adjusting a flow rate of compressive air to be fed on a basis of a pressure value measured by a manometer 144, a filter 148, a manometer 146 for measuring a pressure of nitrogen gas passing through the filter 148, a membrane module 150 capable of permeating nitrogen gas at a slower membrane permeability while discharging hydrogen, oxygen and other gases at a faster membrane permeability, a pressure reducing valve 151 for reducing a pressure value of the nitrogen gas permeated through the membrane module 150 on a basis of a pressure value measured by a manometer 152, an oxygen sensor 153 for sensing oxygen, $O_2$, from gases permeated through the membrane module 150, a flow meter 154 for measuring a flow rate of the nitrogen gas, a needle vale 155 for controlling discharging of separated nitrogen gas, and a discharging port 156 for discharging the nitrogen gas. As described above, the nitrogen gas feed device 14 has a very simplified structure of a membrane separation type, so that nitrogen gas can readily be separated and generated from fed compressive air.

It is preferred to adjust a pressure of the gases to be fed from the gases feed section 14 to a pressure level somewhat higher than atmospheric pressure. Further, the gases feed section 14 may also include, for example, a system for feeding air or other gases as well as nitrogen gas.

Next, a description will be made regarding action of the structure according to the first embodiment of the present invention with reference to the accompanying drawings.

Members 23 for control boards loaded on the belt 67 of the belt conveyor 65 at predetermined intervals are transferred one after another (e.g., in a direction perpendicular to the drawing paper plane of FIG. 1) into an area where the manipulator 60 can be moved. Before performing a step of discharging the highly viscous material, the discharging device 10 is located in a waiting position such that the tip of the rod 19 is engaged with the valve path 28 by compressive air control of the compressive air control section 18, and the highly viscous material fed from the highly viscous material feed section 16 is stored in the material chamber 27. On the other hand, the gas control valve 11c is closed so that the gases discharged from the gases feed section 14 are not yet fed to the discharging device 10.

As the detection sensor 25 detects that the member 23 is carried to the predetermined position, operation of the belt conveyor 65 is temporarily stopped. Then, the controller 22 controls the manipulator 60 so as to transfer the discharging device 10 to a position right above the predetermined applying position of the member and direct the nozzle 12 downward directly to the predetermined applying position thereof. Thereafter, the compressive air control section 18 is controlled so as to release the rod 19 from the valve path 28 and to open the gas control valve 11c.

Once the gas control valve 11c is opened, the gases are discharged directly downward from the tip of the inner nozzle 36 through the inner gas path 30 and the gas nozzle line 32 by aid of feed pressure from the gases feed section 14, thereby forming a gases stream flowing in the one direction. On the other hand, the highly viscous material within the material chamber 11a is also discharged directly downward from the tip of the outer nozzle 38 through the inner material path 29 and the material nozzle line 31 enclosing the inner nozzle by aid of feed pressure from the highly viscous material feed section 16. This creates a flow of the highly viscous material stream in a high speed flow region in substantially the same flow direction as the flow of the gas stream in an outer peripheral space about and enclosing the gases stream flowing in the one direction.

The controller 22 controls the manipulator 60 so as for the discharging device 10 to be movable on a plane (i.e., a plane parallel to surfaces of the member 23) perpendicular to a discharging direction along a predetermined applying position 56 of the member 23 (e.g., a site near an entire circumference of an edge portion of the member 23, e.g. a lid plate as shown in FIG. 8(a)) in such a state that the discharging device 10 is discharging the gases and the highly viscous material from the nozzle 12.

Figure 7A:
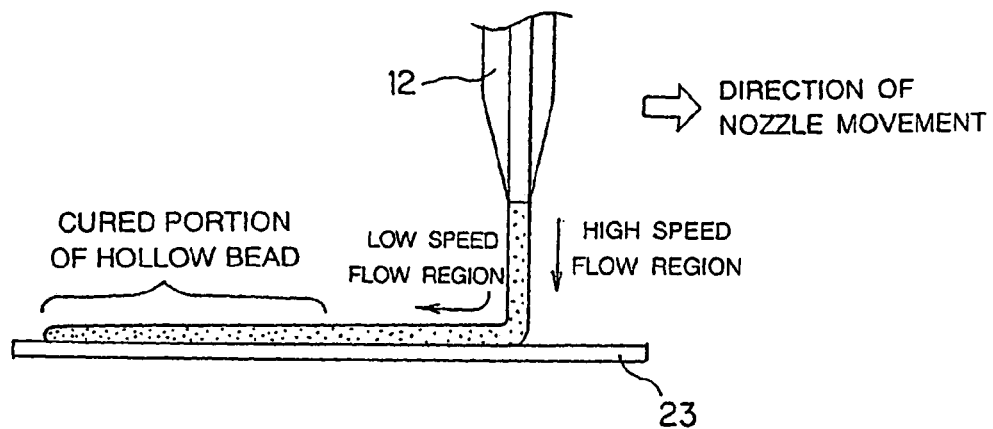

While the highly viscous material is being discharged directly downward to a predetermined applying position of the work 23 from the nozzle 12, a speed of the flow of the highly viscous material stream is in a high speed flow region by the aid of the feed pressure from the highly viscous material feed section, as shown in FIG. 7(a). Therefore, the bead can be molded in a flexible manner by reducing a loss in pressure within the flow passage because of a low dynamic viscosity of the highly viscous material and by transferring the nozzle. However, as the flow of the highly viscous material stream strikes a top surface of the predetermined applying position of the member 23, for example, the flow speed of the highly viscous material stream in the high speed flow region is rapidly decreased to a low speed and eventually to zero. Therefore, a static viscosity of the highly viscous material stream is caused to increase so high that the highly viscous material is allowed to stay in the shape on the predetermined applying position at which the material has been applied and molded in the low speed flow region, i.e., in the shape which it has held as it struck the predetermined applying position on the member 23. In other words, the highly viscous material stream holds the shape in a concentrically circular form with the gas stream, when viewed in section, in such a manner that the highly viscous material stream is located outside about and enclosing the gas stream. Further, as the nozzle 12 is transferred along the applying position while maintaining this state, the highly viscous material is applied and molded into a given shape on the member 23 along a shape of the predetermined applying position thereof. In other words, the highly viscous material is set into a shape into which it is discharged on the predetermined applying position of the work 23.

When a highly viscous material of a cold-setting type is used, it is set continually as time elapses while maintaining a shape as it has been applied. On the other hand, when a highly viscous material of a heat-setting type is used, a heating step of heating the highly viscous material applied has to be added to the step of applying and molding the highly viscous material.

Figure 7B:
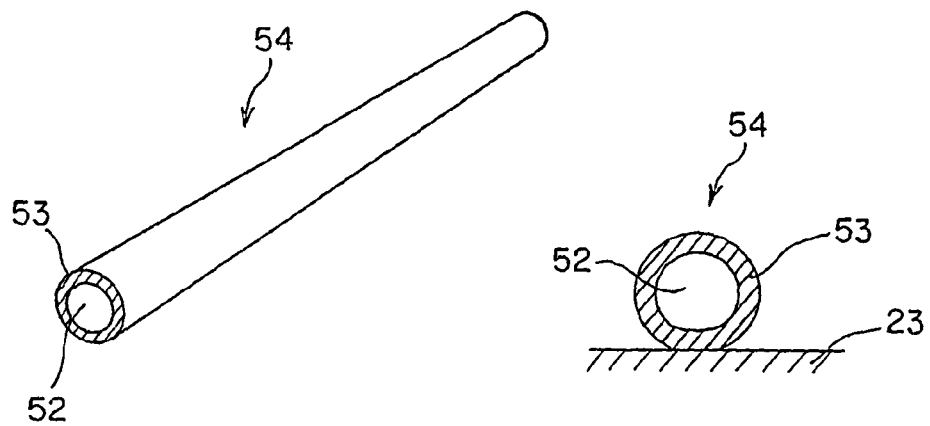

FIG. 7(b) shows a hollow bead applied and molded into a shape in the manner as described above. As shown in FIG. 7(b), a hollow bead 54 in tubular form is shown having a hollow portion 52 formed therein with a gas path left hollow and an outer peripheral portion 53 formed about and enclosing the hollow portion 52. The hollow bead 54 is molded by discharging gases flowing stably through a central portion thereof and highly viscous material flowing stably about and enclosing an outer periphery of a gas stream from the nozzle 12 of a double nozzle configuration. Therefore, the hollow bead applying and molding method according to the present invention can provide a hollow bead of high quality in a stable manner.

The hollow bead 54 can also be molded into a shape in section corresponding to a sectional shape of the nozzle 12 of the discharging device 10. As each of the inner nozzle 36 and the outer nozzle 38 in this embodiment is in the form of a concentric circle as shown in FIG. 3, a sectional shape of the bead 54 is likewise in the form of a concentric circle corresponding to the sectional shape of each of the nozzles 36 and 38. It is to be noted herein as a matter of course that the sectional shape of the bead 54 can be varied in an optional and appropriate manner by optionally varying the sectional shape of each of the nozzles.

The controller 22 can control the manipulator 60 in procedures as described above so as to apply and mold a hollow bead following and along an entire periphery of an applying position 56 (FIG. 8(a)). Upon molding and applying the bead, CCD sensor 25 picks up an image of this applied hollow bead, and image data is always transmitted to the controller 22 through the I/O port 20. The controller 22 extracts an outline of a tip portion of an actually applied hollow bead by analyzing received image data at a real time, and calculates an applying position at a current time. Then, the applying position as a target time pre-stored in the memory unit 24 is retrieved, and a deviation between the actual applying position calculated and a target applying position retrieved is calculated. Thereafter, the manipulator 60 is controlled in accordance with a predetermined control algorithm (e.g., PI control, and the like) so as to adjust an accurate discharging position of the nozzle 12 by adjusting this deviation to substantially zero.

Finally, as shown in FIG. 8(b), hollow bead 57 is applied and molded accurately over an entire periphery close to an edge portion of the member 23. Furthermore, discharging of the discharging device 10 is stopped and then the belt conveyor 65 is re-started, ready for next procedures, and transfers another member 23 loaded next to the member 23 previously processed to the applying position. Like procedures are repeated until all the members 23 have beads applied and molded thereto.

In the method in this embodiment, it may be possible to automatically decide whether one member 23 has had hollow bead 57 applied and molded in a complete and favorable manner. For instance, the CCD sensor 26 picks up an entire image of the hollow bead 57 applied thoroughly, and image data is transmitted to the controller 22. The controller 22 detects an entire outline of the hollow bead 57 by analyzing this image data received, and a feature pattern is extracted. Then, a reference feature pattern of a hollow bead accurately applied, which has been pre-stored in the memory unit 24, is retrieved, and a feature pattern of an actually applied hollow bead is compared with this retrieved reference feature pattern of the hollow bead to determine a degree of similarity. If it is decided that the degree of similarity exceeds a predetermined value, then the hollow bead applied is determined as no good. On the other hand, if it is decided that the degree of similarity is below the predetermined value, the hollow bead applied is determined as good. These decision results may be displayed on a display unit or any other suitable unit (not shown). Therefore, an operator can take necessary measures as soon as possible in accordance with the decision results displayed on the display unit, and the like.

In the embodiment of the present invention, although the member 23 is curved at corners thereof, the hollow bead 57 can be readily applied and molded at a curved portion, e.g., at corners thereof, because the hollow bead 57 is made of a highly viscous material that is fluid and flows in a high speed flow region during application thereof. Moreover, the hollow bead 57 can maintain a configuration in which a gas stream is flowing at a central portion thereof and the highly viscous material stream is flowing about and enclosing the gas stream, so that even a curved hollow bead, by curving a high viscous material of high quality, can also be molded with ease. Therefore, the hollow bead can readily be molded into any optional and suitable shape. In other words, in this embodiment, the hollow bead can readily be applied and molded into an irregular shape, while sustaining high quality, due to fluidity of the highly viscous material in a high speed flow region, flow stability, and ability of retaining the shape into which the bead is molded in a low speed flow region.

In addition, the hollow bead 57 can provide a sealing section with appropriate flexibility because it is lightweight and low in stress upon compression due to a hollow configuration of the bead. This presents merits that sealing properties of an opening/closing member can be improved, for example, when the control board is closed with a lid as the member 23, and that operations for opening and closing the lid can be conducted with ease due to this lightweight material. This embodiment of the present invention can realize the hollow bead applying and molding system 1 having the above merits in simple structure as shown in FIGS. 1 to 6.

Second Embodiment

In a second embodiment, a foamed bead is used, in place of the hollow bead used in the first embodiment, and the foamed bead comprises a foamed body with an inside formed into a tubular shape and an outer periphery having applied thereto a highly viscous material. The same elements of the foamed bead in this embodiment are provided with the same numerical references and symbols as those in the first embodiment, and a duplicate description is omitted for brevity of explanation.

Figure 9:
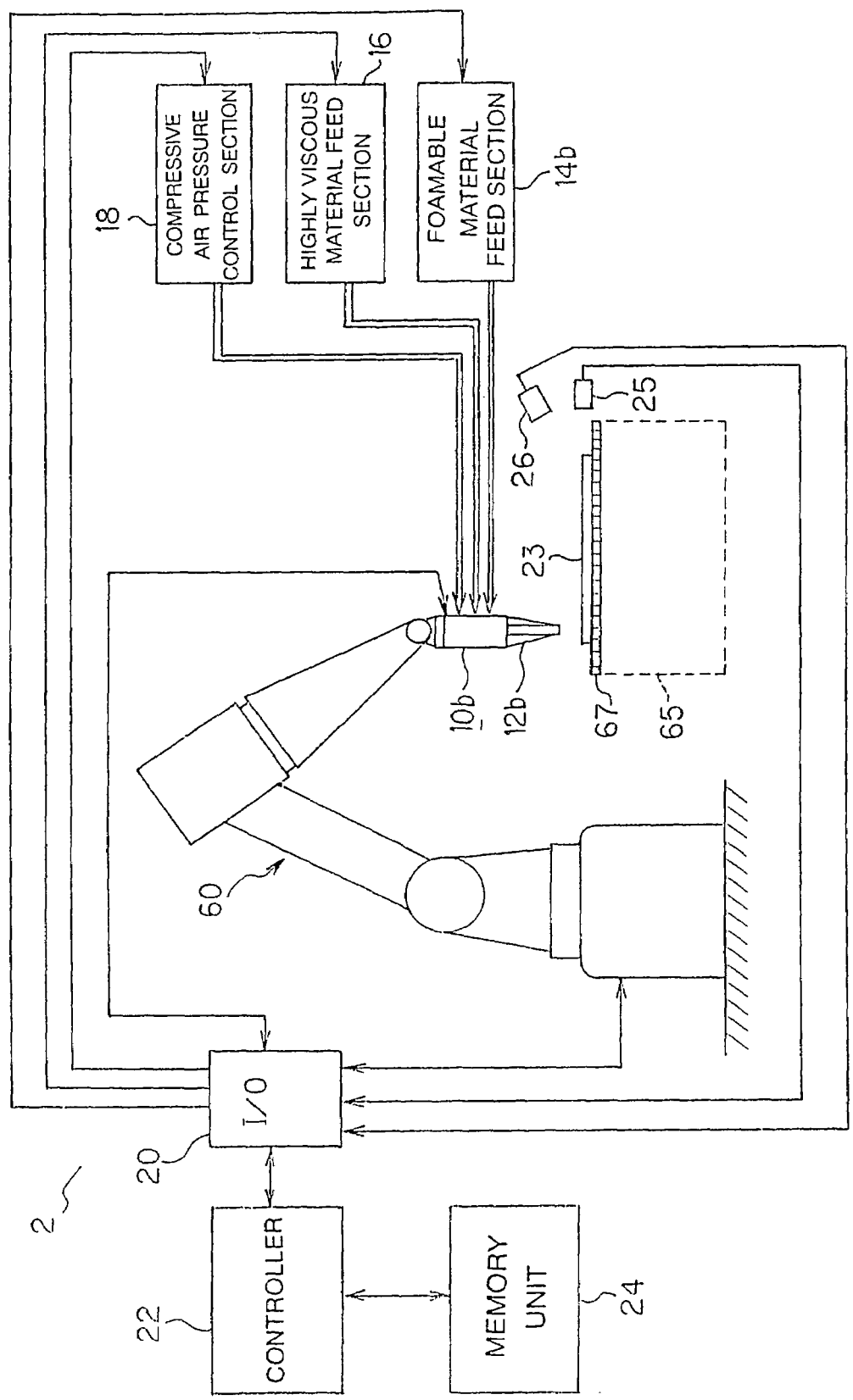
FIG. 9 is a view showing an outline configuration of an automatic foamed bead applying and molding system according to a second embodiment of the present invention.

FIG. 9 shows an overall configuration of an automatically applying and molding system 2 in accordance with the second embodiment of the present invention. The automatically applying and molding system 2 in this embodiment is configured such that the gases feed section 14 used in the first embodiment is replaced with a foamable material feed section 14b that feeds a foamable material for forming a foamed body by foaming gases upon discharging.

In order to adapt this modification to discharging the foamable material, the discharging device 10 in the first embodiment may be modified to a discharging device 10b in the second embodiment. For instance, the discharging device 10b may include a feed inlet for feeding the foamable material and a control valve disposed in the feed inlet, and an inner configuration of the nozzle 12b, particularly a path of the inner nozzle or the like, is modified in a favorable fashion as a path for feeding the foamable material. However, structure of the second embodiment is basically equal to that of the first embodiment, so that a detailed illustration of the discharging device 10b is omitted in the accompanying drawings.

Figure 10:
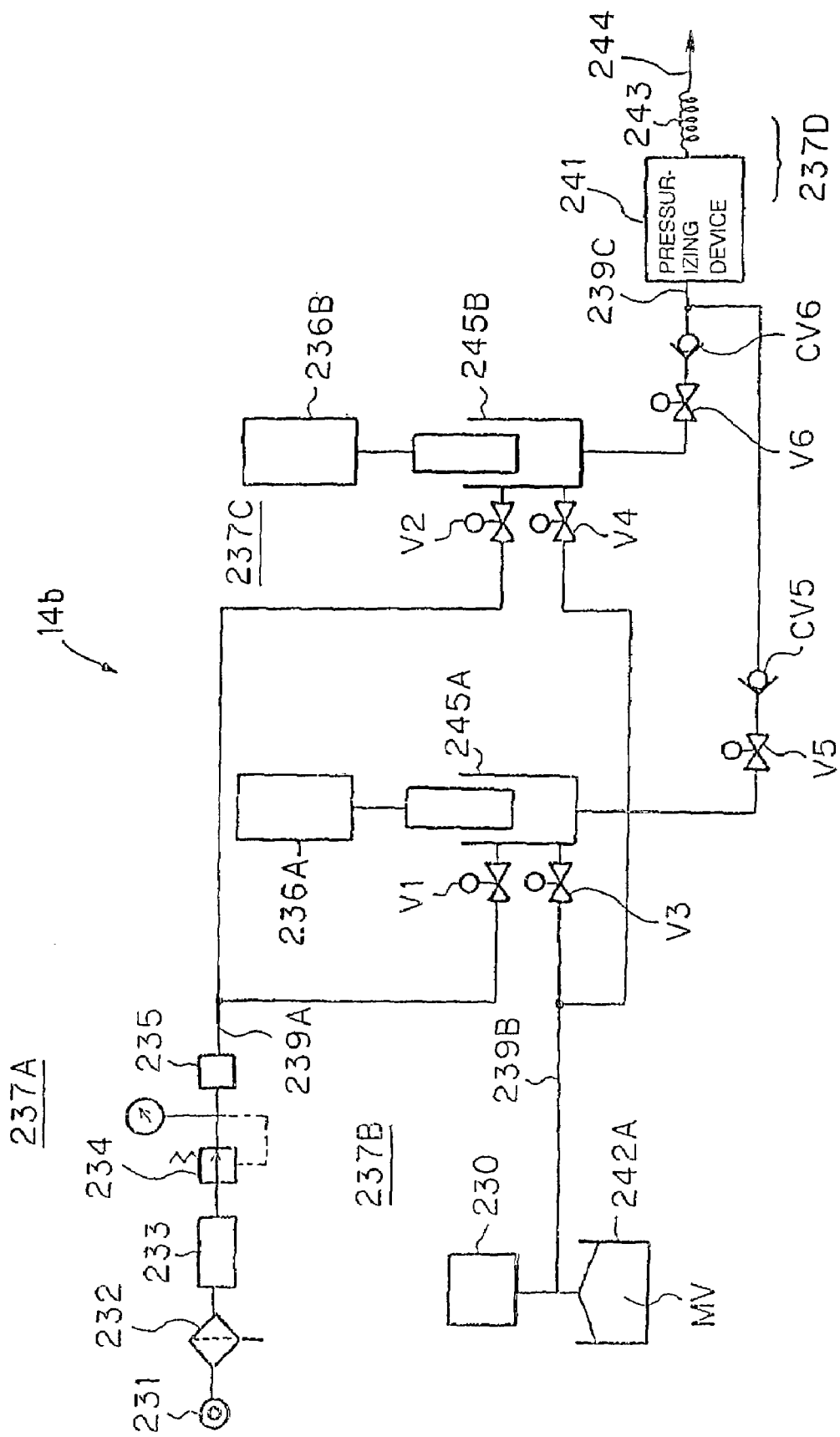
FIG. 10 is a block diagram showing a specific configuration of a foamed material feed unit for use with the automatic foamed bead applying and molding system according to the second embodiment of the present invention.

When the foamable material is fed in the form of a mixture of gases with the highly viscous material, the foamable material feed section 14b may be modified into the structure as shown in FIG. 10. The foamable material feed section 14b may include a gases feed unit 237A, a highly viscous material feed unit 237B, a mixing unit 237C, and a dispersing unit 237D.

The gases feed unit 237A feeds gases at pressure in a predetermined range as low as from approximately 0.1 to 5 $Kg/cm^3$, preferably from approximately 0.1 to 3 $Kg/cm^3$. In this embodiment, a nitrogen gas generator of a known configuration may be used, which is arranged to separate nitrogen gas from compressed air by a membrane separation system. The gases feed unit 237A may comprise, for example, a port 231 for receiving compressed air from a compressor (not shown), a filter 232, a membrane separation module 233, a pressure regulating valve 234, a gas flow meter 235, and a tubular path 239A for feeding separated nitrogen gas.

The highly viscous material feed unit 237B may comprise a plunger pump 242A for discharging the highly viscous material stored in a storage can at a constant flow amount, a motor 230 for driving the pump 242A, and a tubular path 239B through which discharged highly viscous material flows.

The mixing unit 237C may include two piston pumps 245A and 245B, each of which conducts a suction stroke and an extrusion stroke by reciprocally moving a piston in a cylinder. A piston rod of each of the piston pumps 245A and 245B is connected to motors 236A and 236B, respectively, which reciprocally drive the pistons in a linear manner.

The tubular path 239A of the gases feed unit 237A is branched into two tubular path branches, with one tubular path branch being connected to a position close to a top dead center of the piston pump 245A through a control valve V1, and the other tubular path branch being connected to a position close to a top dead center of the piston pump 245B through a control valve V2. Further, the tubular path 239B of the gases feed unit 237B is branched into two tubular path branches, with one tubular path branch being connected to a position close to a bottom dead center of the piston pump 245A through a control valve V3, and the other tubular path branch being connected to a position close to a bottom dead center of the piston pump 245B through a control valve V4. In other words, the piston pumps 245A and 245B are configured to introduce the highly viscous material fed from the highly viscous material feed unit 237B and the gases fed from the gases feed unit 237A, respectively, at a predetermined rate in a batch manner. It is to be understood herein that the term "bottom dead center" of the piston pump referred to herein means a stroke end section of the extrusion stroke and the term "top dead center" of the piston pump referred to herein means a stroke end section of the suction stroke.

Furthermore, the piston pumps 245A and 245B are each provided with a discharging tubular path for discharging a mixture obtainable by mixing gases with the highly viscous material in the cylinder, which extends from the stroke end section of the extrusion stroke. The discharging tubular paths are further provided with valves V5 and V6 as well as check valves CV5 and CV6, respectively, and they are then united into a tubular path 239C.

Figure 11:
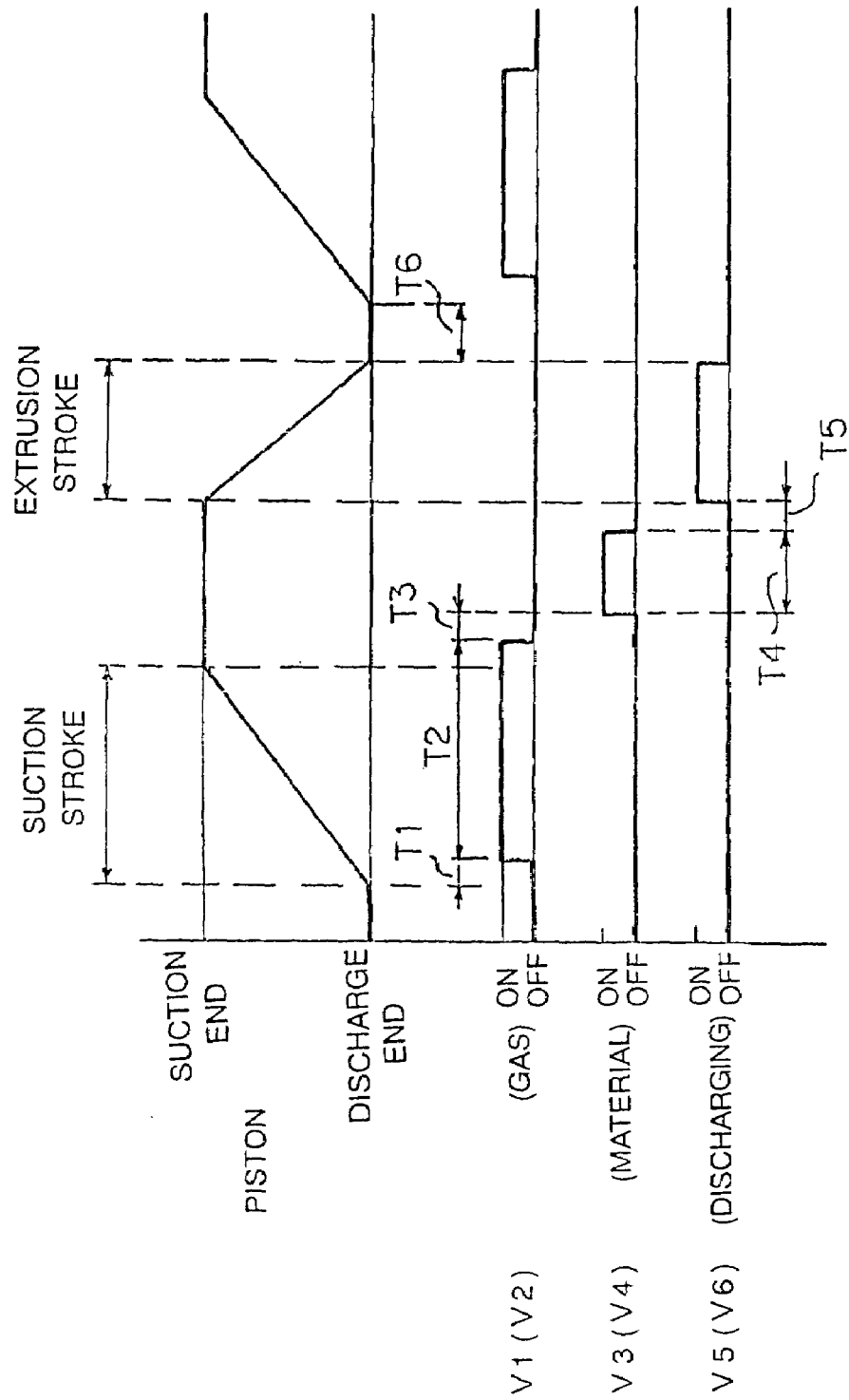
FIG. 11 is a timing chart showing action timing of a cylinder pump of the foamed material feed unit as shown in FIG. 10.

Operations of the piston pumps 245A and 245B of the mixing unit 237C and the valve system are controlled in accordance with a timing chart as shown in FIG. 11. It is to be noted herein that the piston pumps 245A and 245B are operated such that the extrusion stroke of each piston pump does not overlap with each other. As indicated in the timing chart of FIG. 11, the gases are introduced into the cylinder by the suction stroke, and the highly viscous material under a high pressure is allowed to be fed while the piston is positioned at the stroke end section of the suction stroke. Then, a mixture of the gases with the highly viscous material is discharged by the extrusion stroke. In this case, the gases are compressed by the highly pressurized highly viscous material subsequently filled therein to a volume that can be regarded as negligible, so that the highly viscous material can be mixed with the gases in an amount substantially equal to the cylinder volume. This can readily lower a pressure of the gases to be fed into the cylinder and control a mixing ratio of the gases to the highly viscous material by adjusting the pressure of the gases to be fed.

The tubular path 239C is connected to a discharging tubular path 244 through the dispersing unit 237D that in turn may include a pressurizing device 241 composed of a piston pump, or the like, and a dispersing tubular path 243. The pressurizing device 241 then pressurizes the mixture fed while flowing through the tubular path 239C, and the mixture under pressure is introduced into the dispersing tubular path 243. While the mixture is passing through the dispersing tubular path 243, gaseous bubbles are dispersed in more minute form in the highly viscous material. Then, these minutely dispersed gaseous bubbles are expanded as the mixture is released into atmospheric pressure upon discharging, thereby forming a foamed body.

Next, action of the second embodiment of the present invention will be described. A description will be given regarding an action part only, which is different from action of the first embodiment, and a description of an equal and like action part of the first embodiment will be omitted from the following explanation.

In the second embodiment, the discharging device 10b is disposed so as to move along an applying position of member 23 while discharging the highly viscous material from the outer nozzle 38, on the one hand, and the foamable material in the form of a mixture of gases with the highly viscous material from the inner nozzle 36, on the other hand, toward the applying position thereof. At this time, a flow of a foamable material stream in one direction is formed, while a flow of the highly viscous material in a high speed flow region in the same direction is formed within an outer peripheral space outside and about the foamable material stream. As the highly viscous material stream is discharged about and enclosing the foamable material stream and reaches the applying position of the member 23, high speed flow of the highly viscous material stream is dropped to low speed flow and eventually zero, and the highly viscous material stream is applied on the applying position of the work 23 and molded into a shape corresponding to a shape of the applying position thereof. On the other hand, the foamable material stream is discharged and allowed to foam into a foamed body upon exposure to atmosphere. The foamed body is filled inside of the highly viscous material while sustaining its shape, and molded into a shape corresponding to a shape of an inner wall made of the highly viscous material. Then, the highly viscous material and the foamed body are allowed to cure, while sustaining the shape as it was before curing.

In the second embodiment, there is obtained a foamed tubular bead with an interior filled with the foamed body and with an exterior composed of and covered with the highly viscous material (as shown in FIG. 7(b); however, the hollow portion 52 of the hollow bead 54 is replaced with the foamed body).

As the foamed bead is also a foamed body with an interior rich with gases bubbles, it is lightweight and requires a small amount of stress upon compression, thereby providing a sealing section having an appropriate degree of flexibility and softness. Therefore, the foamed bead can present benefits that it provides the lid as member 23 of a control board with improved sealing performance when closed, and that operations of opening and closing the lid are conducted with ease particularly due to its light weight.

Moreover, the foamed bead according to this embodiment can provide a resulting foamed body with improved waterproof performance, airtight performance, shock absorbing performance, and so on, as compared with a bead of a foamed body covered with no highly viscous material.

Third Embodiment

A third embodiment is directed to a bead molding apparatus capable of manually applying and molding a hollow bead or a foamed bead on a desired site, rather than an automatically applying system suitable for a large-scale production in accordance with the above embodiments.

Figure 12:
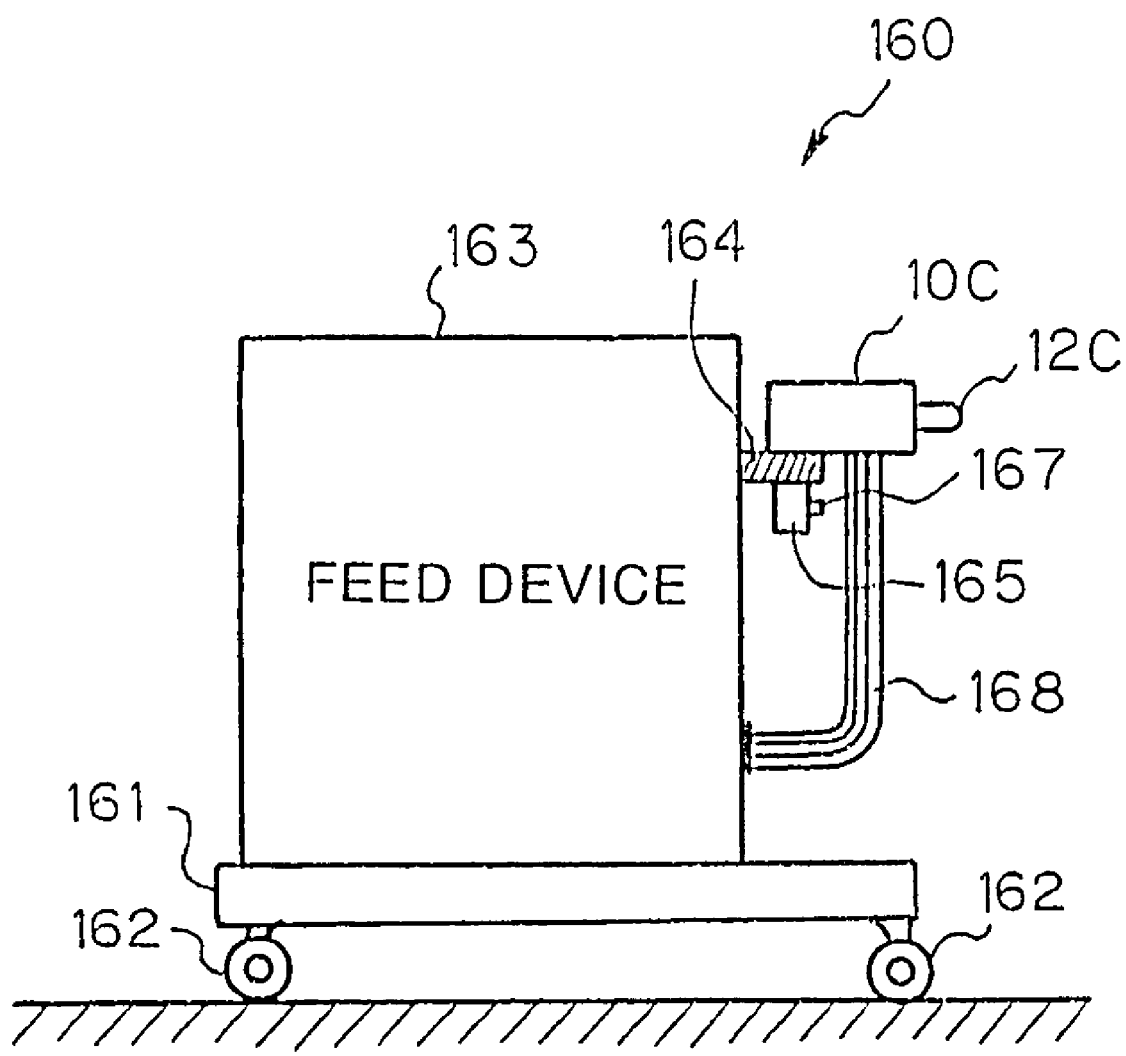
FIG. 12 is an illustrative view showing a bead molding device according to a third embodiment of the present invention.
Figure 13:
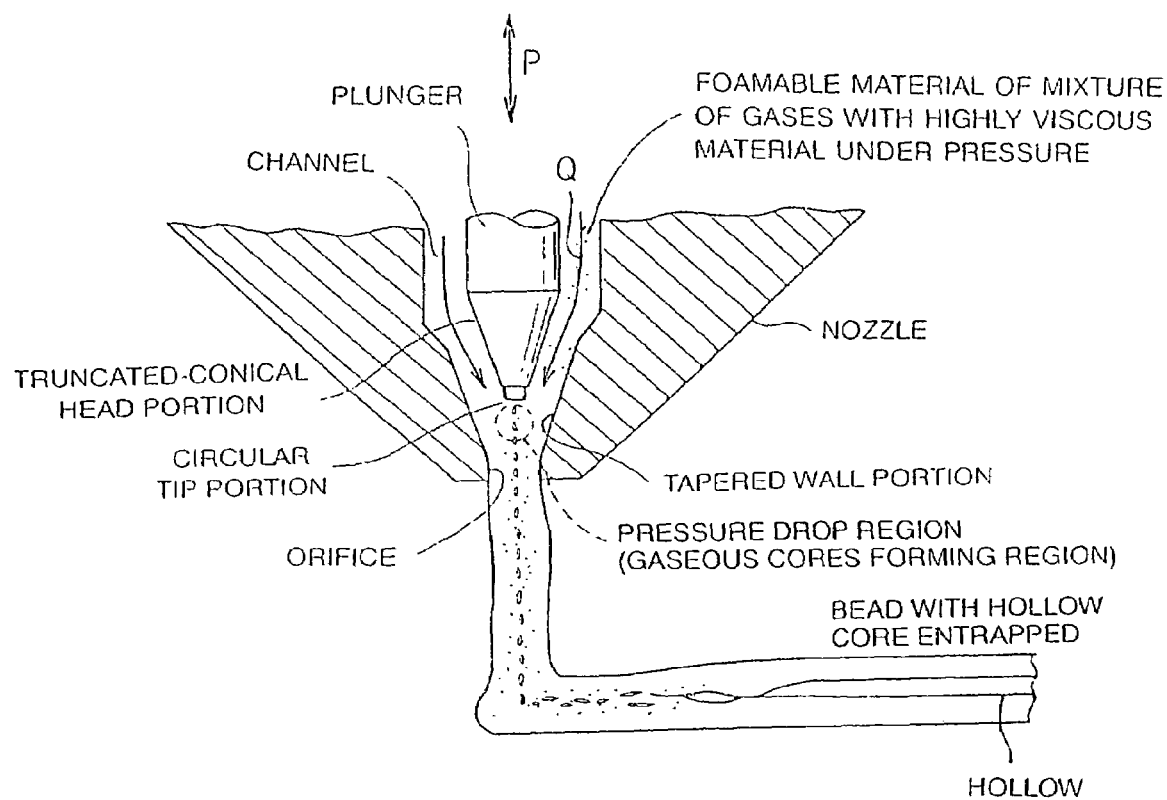
FIG. 13 is a view showing structure of discharging device for explaining prior art technology.

FIG. 12 shows a bead molding apparatus according to the third embodiment. The same and like elements are provided with the same reference numerals and symbols as those in the first and second embodiments, and a duplicate description of the same and like elements will be omitted for brevity of explanation.

Discharging device 10c of FIG. 12 is substantially equal in structure to the discharging device 10 of the first embodiment and the discharging device 10b of the second embodiment. In this embodiment, the discharging device 10c is arranged in such a manner that gas or foamable material is discharged from an inner nozzle and highly viscous material is discharged from an outer nozzle, thereby applying and molding a hollow bead or the foamed bead. The discharging device 10c has a grip portion 165 with a discharging switch 167 and can control opening and closing of a control valve disposed in a path for feeding the gas or the foamable material, and a control valve disposed in a path for feeding the highly viscous material by turning the discharging switch 167 on or off.

As shown in FIG. 12, a bead molding device 160 is disposed on a carrier 161 with casters 162, and comprises a feed device 163 for feeding each of gases or the foamed material and the highly viscous material, a mounting seat 164 disposed extending from a side of a housing of the feed device 163, with the discharging device 10c being disposed detachably on the mounting seat 164 through the grip portion 165, and with a bundle of hoses 168 connecting the discharging device 10c to the feed device 163.

The bead molding device 160 allows an operator to apply to a desired site a hollow bead or a foamed bead.

As has been described above, the present invention has been explained by way of the embodiments. It is to be noted herein, however, that the present invention is not limited in any respect to those embodiments and that any modifications or variations are encompassed without departing from the scope and spirit of the present invention.

Although a hollow tubular bead covered with the highly viscous material is molded in the first embodiment, the present invention can be extended to a system for molding a hollow bead covered with a tubular foamed body. This extension can be readily realized by replacing the highly viscous material feed unit 16 of the bead applying and molding system 1 of FIG. 1 with the highly viscous material feed unit of FIG. 10.

In the above embodiments, controlling speed of flow of the highly viscous material stream or the foamable material stream varies fluidity of the highly viscous material stream or the foamable material stream. It is also possible to use a hot melt material and a foamable hot melt material, with the hot melt material being fluid when it is in a form of a stream in a middle-high temperature region and high in ability to retain a shape into which it is molded when it is in the form of a stream in a middle-low temperature region, and with the foamable hot melt material being obtainable by foaming such a hot melt material. When the hot melt material is used, it is heated before applying to increase its fluidity and to increase its ability to retain a shape into which the material is allowed to cool immediately before applying or after applying.

Further, in the first and second embodiments, the lid for the control board is used as an object to have applied and molded thereto a bead. It is to be noted herein that the present invention is not limited to this object and can be applied to, for example, an opening and closing member for closing an arbitrary opening portion, e.g., a window glass, plastic glass, plastic plate, metallic door, or any other appropriate object, and to a site requiring waterproof, airtight, and shock-absorbing performance, e.g., an engagement section, a clearance section, and the like.

Moreover, in the above embodiments, the bead is applied over an entire periphery of the opening and closing member. The present invention is not limited to this way of applying, and it may encompass a case within the scope of the invention which is directed to applying the bead partially on a portion alone, when only the portion of the periphery of an opening and closing member is attached to an opening portion. In other words, the present invention can vary an applying position in an appropriate and optional way in accordance with the object, i.e. an opening and closing object, or the like.

Furthermore, the present invention is not limited to the specific method for applying and attaching the bead to a predetermined applying object, as described above, and it can be applied to a case where a hollow bead or a foamed bead is molded using a highly viscous material of a non-adhesive property. For instance, it is also possible to prepare a product made of a bead only which is not tacked to any member by molding an elongated bead while winding a discharged and molded bead onto a rotary roller or the like and cutting to a desired length after separating this molded bead from the roller.

In addition, in the second embodiment, a mixture of gases with highly viscous material is used as foamable material. The present invention, however, is not limited to use of the mixture and it may be applied to use of a highly viscous material of a heat-foamable type or a two-liquid foamable material, for example.

Further, in the above embodiments, there is used the mixture feed device 50 with the cylinder pump as a system for mixing the gases with the highly viscous material. The present invention, however, is not limited to this particular mixing system and may include, for example, a stirring-mixing unit such as a mixer and the like.

What is claimed is:

1. A method for molding a bead, comprising:
   forming a stream of foamable material flowing in one direction;
   forming a stream of highly viscous material, flowing at a high speed, in an outer peripheral space surrounding said stream of said foamable material, said highly viscous material being fluid while flowing at said high speed and said highly viscous material retaining a shape while flowing at a low speed; and
   foaming said foamable material while reducing the speed at which said stream of said highly viscous material flows from said high speed to said low speed, thereby forming a bead composed of a foamed body covered with said highly viscous material.

2. The method according to claim 1, further comprising:
   during the foaming of said foamable material while fluidizing said highly viscous material and reducing the speed at which said stream of said highly viscous material flows, applying said bead onto a member while said bead follows a path defined on said member.

3. The method according to claim 2, wherein
   forming a stream of foamable material flowing in one direction comprises discharging said foamable material through an inner nozzle of a discharging device, with said inner nozzle being elongated at a tip thereof,
   forming a stream of highly viscous material comprises discharging said highly viscous material, in the one direction, through an outer nozzle of said discharging device, with said outer nozzle being elongated about and enclosing an outer periphery of said inner nozzle, and
   applying said bead onto said member while said bead follows a path defined on said member comprises transferring said inner nozzle and said outer nozzle along said path while discharging said foamable material and said highly viscous material from said inner nozzle and said outer nozzle, respectively.

4. The method according to claim 3, wherein
   said discharging device is mounted on a manipulator, with said manipulator being transferable to a desired position in response to a control signal, and
   transferring said inner nozzle and said outer nozzle along said path comprises transferring said inner nozzle and said outer nozzle along said path via operation of said manipulator.

5. The method according to claim 4, wherein said member is one of plural members carried on a manufacturing line, and further comprising:
   after applying said bead onto said member, applying said foamable material and said highly viscous material, as another bead composed of said foamed body covered with said highly viscous material, onto another of said plural members by
   (i) transferring said inner nozzle and said outer nozzle along a path, defined on said another of said plural members, via operation of said manipulator, and
   (ii) discharging said foamable material and said highly viscous material from said inner nozzle and said outer nozzle, respectively.

6. The method according to claim 5, wherein
   said plural members each comprise an opening and closing member for closing a predetermined opening.

7. The method according to claim 6, wherein
   said path and said another path each comprises a path disposed along and nearby an edge portion of a corresponding said opening and closing member, and
   applying said bead and said another bead results in a sealing section being formed which is to seal a gap between said corresponding opening and closing member and a corresponding said predetermined opening.

8. The method according to claim 5, wherein
   applying said bead onto said member and applying said another bead onto said another of said plural members comprises
   (i) detecting a position of a portion of said bead and a portion of said another bead when applied to a corresponding said member and said another of said plural members, and
   (ii) based upon said position as detected, controlling said manipulator such that a remaining portion of a corresponding said bead and said another bead is applied to said corresponding said member and said another of said plural members along a predetermined target path.

9. The method according to claim 5, further comprising:
   automatically determining whether said bead and said another bead have been accurately applied to said member and said another of said plural members, respectively, by picking up a corresponding image of said bead and said another bead after having been applied to said member and said another of said plural members, respectively, and comparing said corresponding image as picked up with a corresponding reference image of an accurately applied bead.

10. The method according to claim 3, wherein said member is one of plural members carried on a manufacturing line, and further comprising:
   after applying said bead onto said member, applying said foamable material and said highly viscous material, as another bead composed of said foamed body covered with said highly viscous material, onto another of said plural members by (i) transferring said inner nozzle and said outer nozzle along a path, defined on said another of said plural members, and (ii) discharging said foamable material and said highly viscous material from said inner nozzle and said outer nozzle, respectively.

11. The method according to claim 10, wherein said plural members each comprise an opening and closing member for closing a predetermined opening.

12. The method according to claim 11, wherein said path and said another path each comprises a path disposed along and nearby an edge portion of a corresponding said opening and closing member, and applying said bead and said another bead results in a sealing section being formed which is to seal a gap between said corresponding opening and closing member and a corresponding said predetermined opening.

13. The method according to claim 10, wherein applying said bead onto said member and applying said another bead onto said another of said plural members comprises (i) detecting a position of a portion of said bead and a portion of said another bead when applied to a corresponding said member and said another of said plural members, and (ii) based upon said position as detected, performing an adjustment such that a remaining portion of a corresponding said bead and said another bead is applied to said corresponding said member and said another of said plural members along a predetermined target path.

14. The method according to claim 10, further comprising:

automatically determining whether said bead and said another bead have been accurately applied to said member and said another of said plural members, respectively, by picking up a corresponding image of said bead and said another bead after having been applied to said member and said another of said plural members, respectively, and comparing said corresponding image as picked up with a corresponding reference image of an accurately applied bead.

15. The method according to claim 2, wherein said member comprises an opening and closing member for closing a predetermined opening.

16. The method according to claim 15, wherein said path comprises a path disposed along and nearby an edge portion of said opening and closing member, and applying said bead results in a sealing section being formed which is to seal a gap between said opening and closing member and said predetermined opening.

17. The method according to claim 2, wherein said highly viscous material exhibits tackiness or adhesiveness such that applying said bead onto said member results in said bead becoming tacked or adhered to said member.

18. The method according to claim 2, wherein applying said bead onto said member comprises (i) detecting a position of a portion of said bead when applied to said member, and (ii) based upon said position as detected, performing an adjustment such that a remaining portion said bead is applied to said member along a predetermined target path.

19. The method according to claim 2, further comprising:

automatically determining whether said bead has been accurately applied to said member by picking up an image of said bead after having been applied to said member, and comparing said image as picked up with a reference image of an accurately applied bead.

20. The method according to claim 1, wherein forming a stream of foamable material flowing in one direction comprises discharging said foamable material through an inner nozzle of a discharging device, with said inner nozzle being elongated at a tip thereof, and forming a stream of highly viscous material comprises discharging said highly viscous material, in the one direction, through an outer nozzle of said discharging device, with said outer nozzle being elongated about and enclosing an outer periphery of said inner nozzle.

* * * * *